United States Patent
O'Regan et al.

(10) Patent No.: US 9,013,352 B2
(45) Date of Patent: Apr. 21, 2015

(54) METHOD, SYSTEM, AND MACHINE TO TRACK AND ANTICIPATE THE MOVEMENT OF FLUID SPILLS WHEN MOVING WITH WATER FLOW

(75) Inventors: Peter R. O'Regan, Dhahran (SA); Ali Amer Almohsen, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 254 days.

(21) Appl. No.: 13/454,780

(22) Filed: Apr. 24, 2012

(65) Prior Publication Data

US 2013/0063300 A1    Mar. 14, 2013

Related U.S. Application Data

(60) Provisional application No. 61/478,823, filed on Apr. 25, 2011.

(51) Int. Cl.
*G01S 3/02* (2006.01)
*G01S 19/42* (2010.01)
*G01S 19/17* (2010.01)
(Continued)

(52) U.S. Cl.
CPC .............. *G01S 5/0027* (2013.01); *E02B 15/00* (2013.01); *G01S 19/14* (2013.01)

(58) Field of Classification Search
CPC .............. G01S 1/02; G01S 5/04; G01S 19/42
USPC .......... 342/357.21, 357.25, 357.55, 450, 451; 701/408, 468, 469
See application file for complete search history.

(56) References Cited

U.S. PATENT DOCUMENTS 5,481,904 A    1/1996    Fleck, Sr. et al.
5,532,679 A    7/1996    Baxter, Jr.
(Continued)

OTHER PUBLICATIONS

Barrera, et al., RedACOMAR: Real-time networking activities in the Macaronesian region as a contribution to the Coastal Ocean Observations Panel (COOP), Departamento de Oceanografia Instituto Canario de Ciencias Marinas (ICCM), Las Palmas, Spain, Oct. 26, 2009.

(Continued)

*Primary Examiner* — Dao Phan
(74) *Attorney, Agent, or Firm* — Bracewell & Giuliani LLP; Jeffrey S. Whittle; Amir M. Jamshidi

(57) ABSTRACT

The present invention relates to systems, methods, and machines for tracking a fluid spill. The method includes obtaining real-time location data for a number of tracking devices from a positioning satellite data repository, integrating the location data of each of the tracking devices into a comprehensive spatial data repository, determining a deployment location for each of the tracking devices, identifying, responsive to the deployment locations, a fluid-spill subset of the tracking devices that were deployed in the fluid spill, determining a fluid spill location based on the geographic locations of the fluid-spill subset, and generating a geographic map depicting the fluid spill location. A new sensor-driven paradigm is used that combines practical data gathering methods with advanced enterprise information technologies. The sensor-driven paradigm provides real-time situational awareness to emergency responders and executive stakeholders working from remote locations during an oil spill or chemical fluid release.

38 Claims, 9 Drawing Sheets

(51) Int. Cl.
*G01S 5/00* (2006.01)
*E02B 15/00* (2006.01)
*G01S 19/14* (2010.01)

(56) References Cited

U.S. PATENT DOCUMENTS

| | | | |
|---|---|---|---|
| 5,654,692 | A | 8/1997 | Baxter, Jr. et al. |
| 5,793,813 | A | 8/1998 | Cleave |
| 6,317,029 | B1 | 11/2001 | Fleeter |
| 7,009,550 | B2 | 3/2006 | Moeller-Jensen |
| 2007/0188318 | A1 | 8/2007 | Cole et al. |

OTHER PUBLICATIONS

PCT Partial International Search Report mailed Aug. 27, 2012.
Coppini, G., et al. Hindcast of Oil-Spill Pollution During the Lebanon Crisis in the Eastern Mediterranean, Marine Pollution Bulletin, 2011, pp. 140-153, vol. 62, Elsevier.
Garcia-Ladona, F., et al., The Use of Surface Drifting Floats in the Monitoring of Oil Spills: The Prestige Case, 2005 International Oil Spill Conference, pp. 1-5, [www.iosc.org/papers/IOSC%202005%20a367.pdf].
Goodman, R.H., Simecek-Beatty, D. and Hodgins, D., Tracking Buoys for Oil Spills, pp. 431-445, 1994, [http://www.iosc.org/papers/02212.pdf].
Monahan, E. C. and Monahan E.A., Trends in Drogue Design, Limnology and Oceanography, Nov. 1973, pp. 981-985, vol. 18 No. 6, Published by: American Society of Limnology and Oceanography [Stable URL: http://www.jstor.org/stable/2834592].
Duckham, M., Kulik, L., Worboys, M. and Galton, A., Efficient Generation of Simple Polygons for Characterizing the Shape of a Set of Points in the Plane, Jan. 11, 2008, pp. 1-32, Elsevier.
Replacement International Search Report and Written Opinion for Related PCT Application PCT/US2012/034939, dated Jan. 30, 2013.
N. Kato, et al., Spilled Oil Tracking Autonomous Buoy,Oceans 2010, IEEE, Piscataway, NJ, Sep. 20, 2010.
International Search Report and Written Opinion for Related PCT Application PCT/US2012/034952, dated Nov. 28, 2012.
http://www.argos-system.org/html/services/tracking-monitoring_en.html, Dec. 6, 2006.
Product Website: Dry Pak® Floating Waterproof GPS/PDA/Smart Phone Case, http://www.overtons.com/modperl/product/details.cgi?pdesc=Dry-Pak-Floating-Waterproof-GPS/PDA/Smart-Phone-Case&i=72601, 2003.
Product Website: SPOT® Satellite GPS Messenger, http://www.findmespot.com/downloads/SPOT2-SellSheet.pdf, Dec. 4, 2010.

METHOD, SYSTEM, AND MACHINE TO TRACK AND ANTICIPATE THE MOVEMENT OF FLUID SPILLS WHEN MOVING WITH WATER FLOW

CROSS REFERENCE TO RELATED APPLICATIONS

This application claims the benefit of the filing date of U.S. Provisional Patent Application No. 61/478,823, filed on Apr. 25, 2011, the disclosure of which is incorporated by reference herein in its entirety.

This application relates to co-pending U.S. Non-provisional patent application Ser. No. 13/454,812, by O'Regan et al, titled "Method And Tracking Device for Tracking Movement in a Marine Environment," filed on Apr. 24, 2012, the disclosure of which is incorporated by reference herein in its entirety.

BACKGROUND OF THE INVENTION

1. Field of the Invention

Embodiments of the invention relate to systems, machines, and methods for tracking movement. More specifically, embodiments of the present invention relate to a real-time tracking system for processing location data from tracking devices deployed in a marine environment.

2. Description of the Related Art

During an oil spill emergency, responders need to know two essential facts upfront: (1) the exact location and size of the oil slick, and (2) the potential impact of the slick on industrial facilities and sensitive environmental areas. These facts are monitored throughout the duration of the emergency to plan oil containment and recovery efforts, and monitor the effectiveness of the response efforts. Currently, oil spill responders gain this information through visual observations and verbal radio reports from in-field support vessels, plus periodical aircraft flyovers. This approach is subjective and has some fundamental limitations—especially at night when visibility is effectively zero. Storms and severe offshore weather conditions can also restrict the deployment of helicopters and pollution control assets, while at the same time, accelerating the movement of the oil slick via stronger sea currents.

Along with visual observations, oil spill responders make extensive use of computerized oil slick trajectory models. These simulate the expected movement and fate of the oil based on complex mathematical calculations, scientific assumptions and weather forecasts. Although these models are useful tools, they can never correctly estimate the actual or true path of the oil, due to limitations in both the mathematical models and the weather and sea-state forecasts. Although scientific prediction helps with "best-guess" tactical planning, the reality of the oil slick's dispersion is what matters.

Previous attempts to monitor oil slicks have utilized rigid and heavy, industrially-fabricated floatation buoys to house electronic tracking devices, such as those described in U.S. Pat. No. 5,481,904 (Fleck, 1996), and U.S. Pat. No. 5,654,692 (Baxter, 1997). Additionally, maritime government agencies and academic institutes have experimented with floating tracking buoys for over 3 decades. For example, in 1994, Goodman and Beatty empirically field tested different combinations of floating buoys and electronics packages (see Ron H. Goodman, Debra Simecek-Beatty, and Don Hodgins, *Tracking Buoys for Oil Spills, International Oil Spill Conference* (1994) available at http://iosc.org/papers/02212.pdf). Similarly, Garcia-Ladona et.al (2002) tested different "surface drifting floats" to monitor and predict the movement of the Prestige oil slick off the North Western Spanish Coast (see Garcia-Ladona, Font et al *The use of surface drifting floats in the monitoring of oil spills: the Prestige case, International Oil Spill Conference* (2005) available at wvvw.iosc.org/papers_posters/IOSC%202005%20a367.pdf). The goal in all cases is to create a device that will float at the same velocity and direction as the oil. In reality, none of these devices has achieved the goal. The monitors used in the prior art have been large rigid, industrially fabricated floating buoys that project a significant amount of surface area above the water level. This surface area results in significant aerodynamic wind forces that cause such buoys to have velocities and directions different than that of the sea surface or oil spilled into the sea.

The prior art has employed expensive, bulky transponders such as ARGOS. Beyond the physical limitations of such buoys, the cost has been a barrier to mainstreaming tracking buoys into the oil spill responder's 'tool kit'. These prior art spill tracking devices had limited value beyond oil spill tracking due to their size, weight and cost.

The software interfaces and data flows used in the prior art have been limited. The raw data has typically been transmitted from the floating device and sent directly to a scientist or technician's laptop computer, where it has been interpreted and made into custom one-off map diagrams. These maps have then been relayed to stakeholders via email or PowerPoint presentations. It is an ad hoc, "grass-roots" approach to communication and decision-making which leads to errors and time delays.

SUMMARY OF THE INVENTION

Applicant has recognized that it would be beneficial to develop a system that could not only be useful for fluid spills, but that could also be used in other application such as determining the precise location of fluid spill booms, functioning as a marker buoy to show the position of live diving operations, locating a life raft at an offshore facility, and acting as a personal locator attached to a life vest of workers conducting tasks at offshore facilities. Therefore a cost-effective, multipurpose solution to address the shortfalls of the prior art noted above would be desirable.

The system, machine, and method of the current application provides a new, low-cost tool for emergency responders to accurately measure and map the actual movement of sea currents or fluid slicks regardless of weather, sea-state, or visibility. Embodiments of the invention enhance both the emergency preparedness and decision making capabilities of those who work in a marine environment by allowing emergency responders and management to see the exact location and behavior of the fluid slick and rapidly plan strong contingency measures such as sea water intake protection. In some embodiments, the solution utilizes low-cost, ruggedized, simple tracking devices, which can be integrated with a company's existing enterprise information technology systems.

The previous spill tracking systems had limited value beyond fluid spill tracking due to the size, weight and cost of the tracking devices. However, in addition to 24 hour tracking of fluid slicks, embodiments of the invention have potential uses in marine search and rescue operations. For example, during a man overboard event, one of the devices/tools could be deployed in the immediate vicinity of the person's last position (e.g. an offshore platform or sinking vessel). In this example, the device would transmit the actual sea currents in a local offshore area, enabling geographic information systems (GIS) displays to be generated that accurately depict the local sea currents and focus rescue resources down current. The improved GIS maps displays could potentially save time, resources, and most importantly—lives.

Embodiments of the invention could also be used to track emergency life rafts stationed at offshore oil and gas processing facilities. In this case, the tracking device would serve as a low-cost and effective locator beacon in the event of the raft being deployed.

Beyond the safety applications, embodiments of the invention could provide marine supervisors and planners with an accurate overview of portable offshore assets and operations. For example, the system could be used to mark the location of under-sea dive crews doing underwater welding at an offshore pipeline or platform. In this example, providing a unified map-based view of all diving operations would encourage optimization of resources, and could also improve health and safety by improving awareness of where the crews are operating.

In alternative applications of some embodiments of the invention, accurate, local sea current data could be economically collected. Using live sea surface current data would dramatically improve the accuracy of fluid spill trajectory models and help drive more accurate decisions and contingency plans. For example, the tracking devices could be deployed into the sea during emergency drills to simulate a moving fluid spill or a man overboard event. In this example, GIS maps displays generated based on live data would improve the realism of offshore drills and would also enable the fluid spill trajectory models or sea surface mapping models to be scrutinized during an integrated scenario.

Data collected with embodiments of the present invention could also support the design of marine engineering projects such as shoreline protection, upgrading sea-water intakes, or dredging of sea channels or ports. For example, by monitoring a number of tracking devices, accurate sea-current data could be collected across any project area on several dates to reduce seasonal weather factors. Such data is expensive to collect using conventional approaches.

The system, machine, and method of the current application are designed to provide live situational awareness of complex operations taking place in the vast and hazardous marine environment. The system and machine incorporates location data from tracking devices in real-time to map the location of fluid slicks, people, assets or routine but hazardous operations. For example, the system may use global positioning systems technology and satellite communications technology to relay data (location, speed, direction and status) of the fluid slick or floating asset at regular intervals, such as every 10 minutes. In this example, the location data is securely transmitted to a designated enterprise's GIS (mapping) software applications through traditional intranet systems. In one or more embodiments of the invention, custom software interfaces consolidate the data and present it graphically on pre-existing information systems including GIS. In this case, authorized support staff and management could then visualize the overall location and status of all critical marine operations on detailed, interactive map displays on their personal computers or Control Center wall display screens.

In one embodiment, the method for tracking a fluid spill when moving with water flow includes obtaining location data for each of a number of tracking devices from a positioning satellite data repository, the location data for each of the respective tracking devices including a device identifier and a geographic location of a tracking device and a timestamp for the geographic location. The method further includes integrating the location data of each of the tracking devices into a spatial data repository according to the device identifier, determining a deployment location for each of the tracking devices based on the device identifier, identifying, responsive to the deployment location and velocity of each of the tracking devices, a fluid-spill subset of the tracking devices that were deployed in the fluid spill, determining a fluid spill location and velocity based on the geographic locations of the fluid-spill subset, and generating a geographic map including the fluid spill's actual location and movement.

In another embodiment, a system for tracking a fluid spill includes one or more non-transitory memories, one or more processors, each operatively connected to at least one of non-transitory memories, a spatial data repository adapted to store spatial data for a fluid spill response, computer-executable program instructions stored on the one or more non-transitory memories and executable by the one or more processors, and a user display associated with the one or more processors and being responsive to the map module to display the geographic map to a user. The computer-executable program instructions include a positioning data interface module executed by the one or more processors to obtain location data for each of numerous tracking devices from a positioning satellite data repository, the location data for each of the numerous tracking devices including a device identifier of a tracking device, a geographic location and velocity (i.e., heading and speed) of the tracking device, and a timestamp to identify a time when the geographic location was obtained, a spatial data interface module executed by the one or more processors to integrate the location data of each of the numerous tracking devices into the spatial data repository according to the device identifier, a spatial data manager module executed by the one or more processors to determine a deployment location for each of the numerous tracking devices responsive to the device identifier and identify, responsive to the deployment location of each of the numerous tracking devices, a fluid-spill subset of the numerous tracking devices that were deployed in the fluid spill, a modeling module executed by the one or more processors to determine a fluid spill location based on the geographic locations of the fluid-spill subset, and a map module responsive to the modeling module and being executed by the one or more processors to generate a geographic map including the fluid spill location. The dynamic map may then form the basis for detailed tactical planning and optimal deployment of assets.

In another embodiment, a non-transitory computer readable medium having computer-executable program instructions for tracking a fluid spill embodied therein that when executed cause one or more computer processors to obtain location data for each of numerous tracking devices from a positioning satellite data repository, the location data for each of the numerous tracking devices including a device identifier of a tracking device, a geographic location and velocity of the tracking device, and a timestamp to identify a time when the geographic location was obtained, integrate the location data of each of the numerous tracking devices into a spatial data repository according to the device identifier, determine a deployment location for each of the plurality of tracking devices responsive to the device identifier, identify, responsive to the deployment location and velocity of each of the numerous tracking devices, a fluid-spill subset of the tracking devices that were deployed in the fluid spill, determine a fluid spill location based on the geographic locations of the fluid-spill subset, and generate a geographic map including the fluid spill location. This dynamic map then forms the basis for tactical deployment of assets and detailed situational monitoring.

In another embodiment, a machine for tracking a fluid spill includes one or more non-transitory memories, one or more processors, each operatively connected to at least one of the one or more non-transitory memories, a spatial data repository adapted to store spatial data for a fluid spill response, and computer-executable program instructions stored on the one or more non-transitory memories and executable by the one or more processors. The computer-executable program instructions include a positioning data interface module executed by the one or more processors to obtain location data for each of numerous tracking devices from a positioning satellite data repository, the location data for each of the tracking devices including a device identifier of a tracking device, a geographic location and velocity of the tracking device, and a timestamp to identify a time when the geographic location was obtained, a spatial data interface module executed by the one or more processors to integrate the location data of each tracking device into the spatial data repository according to the device identifier, a spatial data manager module executed by the one or more processors to determine a deployment location for each of the tracking devices responsive to the device identifier and identify, responsive to the deployment location of each of the numerous tracking devices, a fluid-spill subset of the tracking devices that were deployed in the fluid spill, a modeling module executed by the one or more processors to determine a fluid spill location based on the geographic locations of the fluid-spill subset, and a map module responsive to the modeling module and being executed by the one or more processors to generate a geographic map including the fluid spill location. The dynamic map may then form the basis for tactical deployment of assets and detailed situational monitoring.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE DISCLOSURE

As discussed in more detail below, provided in some embodiments are systems and methods for actively tracking movement using low-cost tracking devices, which can be useful for emergency response planning, tactical oil spill response planning, or other applications in which movement is tracked in a marine environment. In one embodiment, the method for tracking fluid spills when moving with a water flow includes the steps of obtaining location and movement data for each of a number of tracking devices from a positioning satellite data repository, the location data for each of the respective tracking devices including a device identifier, a geographic location and velocity (historical and current) of a tracking device, and a timestamp for each geographic location and velocity received. The method further includes integrating the location and velocity data of each of the tracking devices into a spatial data repository according to the device identifier, determining a deployment location for each of the tracking devices based on the device identifier, identifying, responsive to the deployment location and velocity of each of the tracking devices, a fluid-spill subset of the tracking devices that were deployed in the fluid spill, averaging the historical and current geographic locations of the fluid-spill subset to determine the actual fluid spill location, extrapolating the velocity vectors to predict the most likely future position based on actual sea conditions, and generating a geographic map showing the fluid spill location along with the position of deployed response assets.

In some embodiments, a tracking device may be described as physically tracking a movement of a desired object in that the tracking device is physically repositioned in accordance with the movement of the desired object. In this case, the location data collected as the tracking device is repositioned may be used to anticipate the movement of the desired object.

Figure 1:
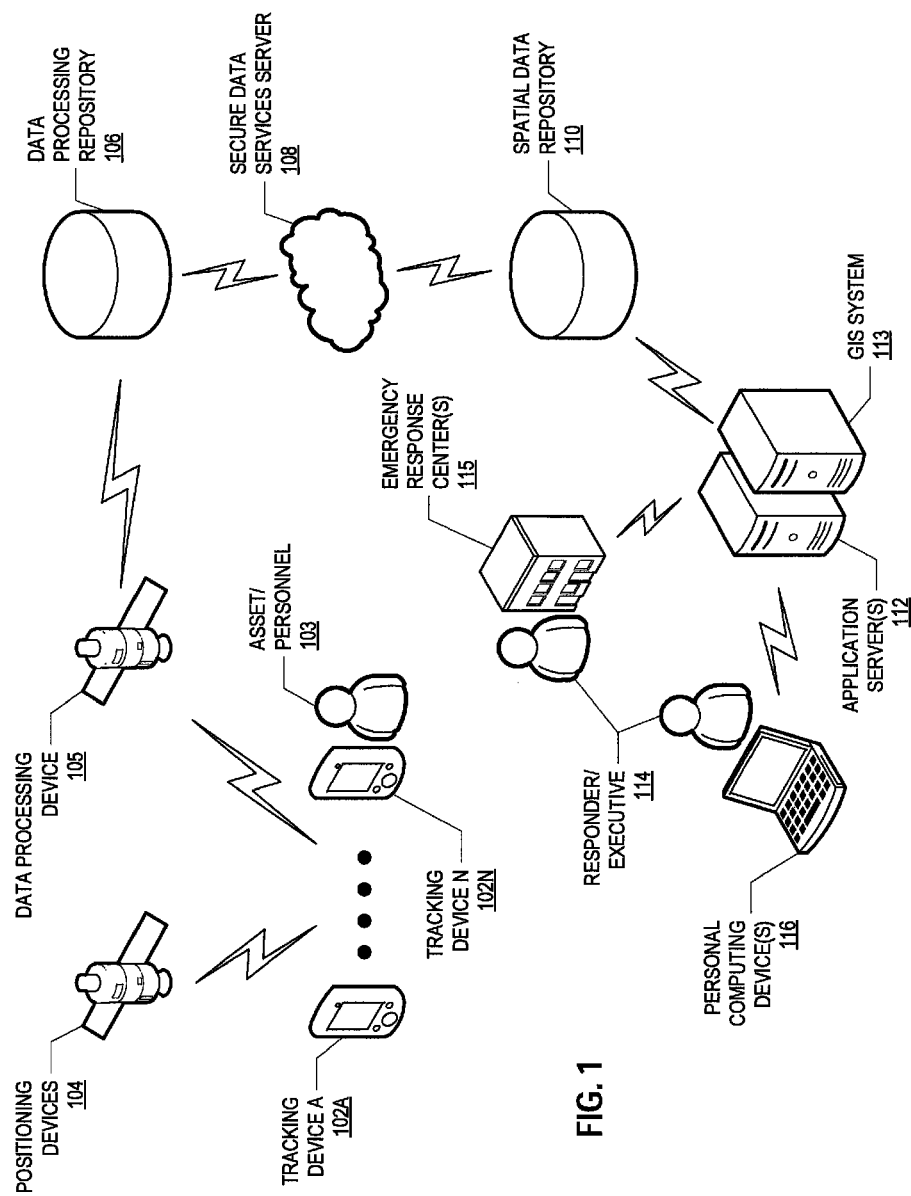
FIGS. 1-2 are schematic diagrams of systems in accordance with one or more embodiments of the invention.

FIG. 1 shows a schematic diagram of a system in accordance with one or more embodiments of the invention. The system comprises one or more tracking device(s) (e.g., 102A, 102N). For example, the tracking device(s) (e.g., 102A, 102N) may correspond to the tracking device described in the related, co-pending U.S. Non-provisional patent application Ser. No. 13/454,812, by O'Regan et al, titled "Method And Tracking Device for Tracking Movement in a Marine Environment," filed on Apr. 24, 2012, the disclosure of which is incorporated by reference herein in its entirety.

A positioning device 104 is configured to provide a location signal that may be used to determine the location of the tracking devices (e.g., 102A, 102N). Specifically, in some embodiments, the positioning devices 104 may include a satellite or network tower with a signal transmitter configured to provide radio frequency ("RF") signals to the tracking devices (e.g., 102A, 102N), where the RF signals allow a tracking device to determine a precise location of the tracking device. For example, the positioning devices 104 may include a global positioning system (GPS) as will be understood by those skilled in the art, where the GPS includes multiple satellites that broadcast RF signals and navigation messages. In this example, the RF signals are used by the tracking devices (e.g., 102A, 102N) to determine the distance to each satellite, and the navigation messages are used to determine the location of each satellite. The distance to and location of each satellite may be used to determine the global location of a tracking device with the aid of, for example, triangulation.

The location determined using the positioning devices 104 may be transmitted by the tracking devices (e.g., 102A, 102N) to a data processing device 105. Additional data, such as the speed, direction, status, timestamp, and device identifier of the tracking device may also be transmitted to the data processing device 105. For example, the data processing device 105 may be a commercial satellite system such as the GLOBALSTAR™ constellation, a system of low-earth orbit satellites used for satellite phones and low-speed data communications. The data processing device 105, in turn, transmits the collected data to either a data processing repository 106, such as one managed by the satellite operator, or directly to the spatial data repository 110. If the data is transmitted to a data processing repository 106, secure data services 108 relay the data to the spatial data repository 110. For example, secure data services 108 may include a custom software module that intercepts the data messages and securely integrates them into a spatial data repository 110. The spatial data repository 110 may be, for example, part of an enterprise GIS system that supports fluid spill and emergency response activities at all levels. Secure data services 108 leverages standard computing environments to facilitate ease of integration. In some embodiments, the spatial data repository 110 may be an enterprise database such as the ORACLE® Database. ORACLE® is a registered trademark of Oracle Corporation, a corporation organized under the laws of Delaware and headquartered at 500 Oracle Parkway, Redwood Shores, Redwood City, Calif., United States. GLOBALSTAR™ is a trademark of GlobalStar, Inc., a company headquartered in Covington, La., United States.

An application server(s) 112 securely accesses and manipulates the data stored in the spatial data repository 110. In one or more embodiments, the application server(s) 112 use robust programming methods and industry standards, such as the JAVA® programming language and libraries, to ensure portability into standard computing infrastructures. For example, the application server(s) 112 may be compatible with most large-scale, corporate computing environments, taking little technical support to integrate with current system standards. JAVA® is a registered trademark of Oracle Corporation, a corporation organized under the laws of Delaware and headquartered at 500 Oracle Parkway, Redwood Shores, Redwood City, Calif., United States.

The application server(s) 112 present the data for dynamic display using commercial Geographical Information Systems (GIS) 113, such as ARCGIS® Server and GOOGLE EARTH™ mapping service. For example, a GIS system 113 may render a real-time response map for a wall display of a Control Center 115 during an emergency response. These advanced mapping technologies 113 enable incident responders and executive stakeholders 114 alike to view the status of offshore operations on a real-time, interactive map display. In this example, the live data may be pushed directly to incident commanders and executive stakeholders 114 in a value-added form, to support tactical decision-making in near real-time.

In one embodiment, after deploying the tracking devices around the perimeter and in the approximate center of a fluid slick, the data can be remotely and securely monitored in multiple emergency response centers 115, 24 hours a day throughout the duration of any incident. In other embodiments, the tracking devices may be deployed in the leading edges, the center, and trailing edges of the fluid slick for remote and secure monitoring via personal computing devices 116. ARCGIS® is a registered trademark of ESRI, a private company headquartered in Redlands, Calif., United States. GOOGLE EARTH™ is a registered trademark of Google Inc., a corporation organized under the laws of Delaware and headquartered in Mountain View, Calif., United States.

In one or more embodiments, the fluid spill may include any combination of an oil fluid, a chemical composition fluid, and a hydrocarbon-based fluid. In one or more embodiments, the tracking devices may be used to measure, record and map the sea-surface currents without the presence of any contaminant(s).

In one or more embodiments, the tracking devices (e.g., 102A, 102N) may communicate data to each other over a mesh network. For example, a tracking device may transmit the positioning signal it receives from the positioning device(s) 104 to other nearby tracking devices. In this example, the positioning signal may then be used by the other tracking devices to improve their GPS functionality in, for example, bad weather conditions. In another example, a tracking device (e.g., 102A, 102N) that is unable to communicate with the data processing device 105 may transmit location data to neighboring tracking devices, which then relay the location data to the data processing device 105 (i.e., the mesh network allows for fault tolerant communications with the data processing device 105).

Figure 2:
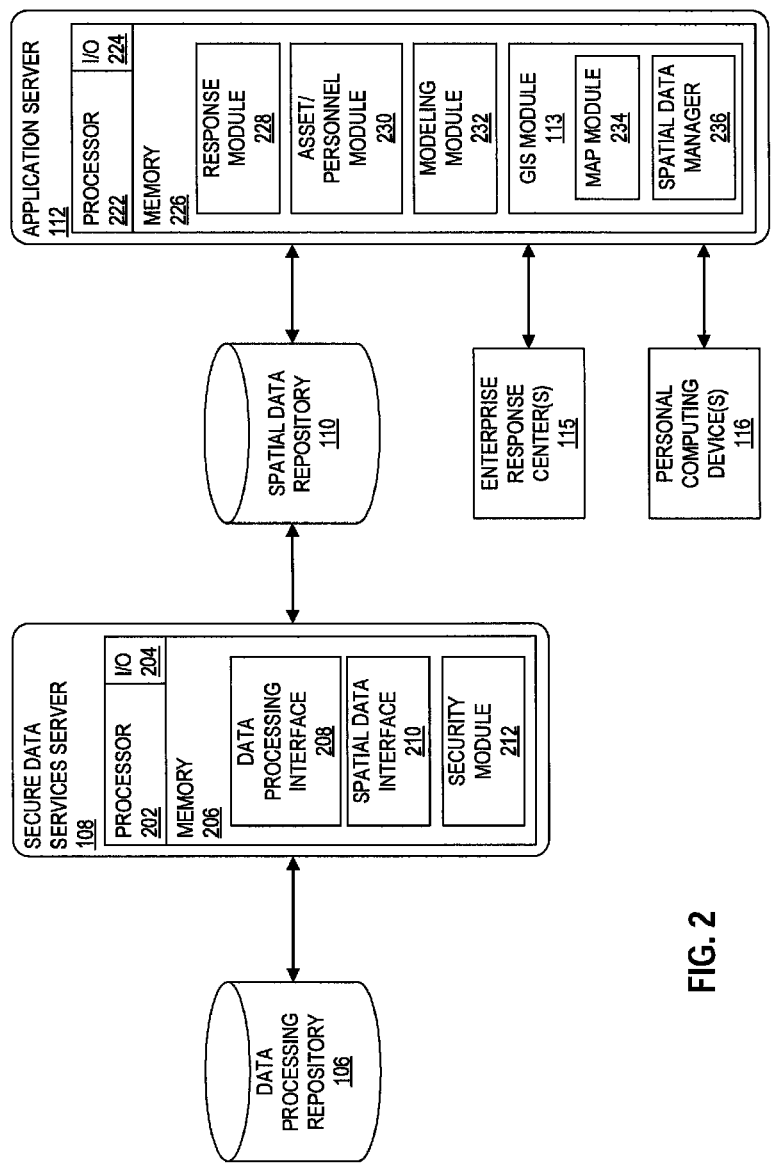

FIG. 2 shows a schematic diagram of a system in accordance with one or more embodiments of the invention. The example system includes secure data services 108 interacting with a data processing repository 106 and a spatial data repository 110. Further, the system includes an application server 112 that interacts with the spatial data repository 110, enterprise response center(s) 115, and personal computing device(s) 116.

In some embodiments, the data processing repository 106 is configured to store location data received from a data processing device (e.g., 105 of FIG. 1). The data processing repository 106 may correspond to a server, a database, files, a memory cache, etc. that is connected to a data processing device. As discussed above, the data processing device may be a satellite that receives location data from one or many tracking devices (e.g., 102A, 102N of FIG. 1). In this case, the data processing repository 106 may be correspond to a positioning satellite data repository that is configured to store location data generated using a positioning satellite (104 of FIG. 1). The location data may include geographic coordinates, bearing, speed, timestamp, tracking device identifiers, etc. The data processing device may relay the location data for storage in the data processing repository 106.

The data processing repository 106 may be configured to receive location data from multiple data processing devices (e.g., 105 of FIG. 1). For example, the location data stored in the data processing repository 106 may be related to a number of tracking devices, where data records may be associated to a particular tracking device based on a corresponding tracking device identifier (e.g., numeric identifier, alphanumeric identifier, globally unique identifier, etc.). Other live tracking devices may provide data to be stored and integrated within the data processing repository 106 including, for example, live vessel locations received through tracking transponders. In this example, the data processing repository 106 may be continually updated such that the stored location data includes the real-time location data of the tracking devices and other data sources. The location data is considered to be 'near real-time' data in that the data is collected by the tracking devices in a very short time span (e.g. 10 minutes or less) and immediately delivered to the data processing repository 106.

In some embodiments, the secure data services server 108 is a computing device configured to execute data services for processing data from sources (e.g., positioning device repository 106) external to a network (e.g., a secure local area network). In some embodiments, the application server 112 includes a processor 202, an input/output module 204, and memory 206. The secure data services server 108 may include various types of computing devices that execute an operating system. The processor 202 may execute instructions, including instructions stored in the memory 206. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 204 of the secure data services server 108 may include an input module, such as a radio frequency sensor, a keyboard, a touch screen, and/or a mouse, and an output module, such as a radio frequency transmitter, a printer, and/or a monitor. The secure data services server 108 may be connected to a local area network (LAN) or a wide area network (e.g., the Internet) via a network interface connection. In some embodiments, the input/output module 204 may take other forms.

Further, the secure data services server 108 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 206 includes a data processing interface 208, a spatial data interface 210, and a security module 212. The aforementioned components of the secure data services server 108 may be implemented on multiple computing devices (i.e., servers), where a load balancing scheme distributes requests across the multiple computing devices.

In some embodiments, the data processing interface 208 of the secure data services server 108 is configured to receive and process location data from the data processing repository 106. For example, the data processing interface 208 may be configured to use a secure Internet protocol (e.g., Internet protocol security, secure sockets layer, transport layer security, secure shell, etc.) to connect to and receive location information from the data processing repository 106. In this example, the data packets received by the data processing interface may be encrypted. The data processing interface 208 may use the security module 212 to establish the secure connection with the data processing repository 106 and to interpret the encrypted data packets.

In some embodiments, the data processing interface 208 may be configured to (1) validate the location data to ensure the data is in the proper format; (2) retrieve location data based on tracking device identifiers; (3) monitor the location data for updates; etc. After the location data is processed by the data processing interface 208, the data may be provided to the spatial data interface 210 for storage in the spatial data repository 110.

In some embodiments, the spatial data interface 210 of the secure data services server 108 is configured to store location data in the spatial data repository 110. For example, the spatial data interface 210 may be configured to ensure the location data is in the appropriate format prior to storing the data in the spatial data repository 110. In this example, the spatial data interface 210 may convert the location data to the appropriate data format if the data is in a different format. The spatial data interface 210 may also be configured to ensure that the location data is in the appropriate coordinate system. Specifically, the spatial data interface 210 may ensure that the location data is in the correct geographic and projected coordinate systems before the data is stored in the spatial data repository 110.

In some embodiments, the spatial data interface 210 may also analyze the individual velocity readings from a cluster of tracking devices (e.g., 102A and 102N of FIG. 1) to determine whether all tracking devices are sending valid speed readings. In this case, should any of the tracking devices (e.g., 102A and 102N of FIG. 1) provide unreliable velocity data, the spatial data interface 210 may be configured to automatically adjust the velocity to represent an average of the nearest neighboring tracking devices, A geographic coordinate system uses a 3D spherical surface to define locations on the earth. A projected coordinate system defines locations on a 2D surface and is based on a geographic coordinate system. In other words, a projected coordinate system allows for locations defined on a 3D spherical surface to be projected onto a 2D surface. Confirming that the location data received from the data processing repository 106 is in the appropriate geographic and projected coordinate systems ensures that the location data is compatible with existing data in the spatial data repository 110, and that the data can be reliably visualized by the GIS module 113 of the application server 112 as discussed below.

In some embodiments, the spatial data repository 110 is configured to store location data for use by the spatial data manager 236 of the GIS module 113. The spatial data repository 110 may correspond to a server, a database, files, a memory cache, etc. that is stored locally (e.g., located on the application server) or shared on a network (e.g., a database server). In some embodiments, the data processing device (105 of FIG. 1) may interact directly with the spatial data repository 110 to store collected location data. In some embodiments, metadata associated with the location data is stored in a separate repository (not shown). For example, the spatial data repository 110 and the separate repository may be organized in a distributed relational database architecture.

In some embodiments, spatial data describes the geographic location of features (e.g., points of interest, industrial facilities, geo-located satellite images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. Spatial data may represent a static data source (e.g., the location of an industrial facility) or a dynamic data source (e.g., the live location of a moving vessel). In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers.

In some embodiments, the spatial data repository 110, or a related repository, is configured to store derived information that is related to the location data. For example, the spatial data repository 110 may also store the results of analysis (e.g., geographic center, trajectories, statistical cluster analysis, etc.) performed on the stored location data. In another example, the spatial data repository 110 may also store metadata (e.g., descriptions, collection timestamps, etc.) related to the stored location data.

In some embodiments, the security module 212 of the secure data services server 108 is configured to establish secure data connections and to interpret encrypted data packets. For example, the security module 212 may manage cryptographic keys to be used to decrypt data packets received during a communication session. In this example, the cryptographic keys may be determined when the security module 212 initiates a secure data connection with the target device. In some embodiments, other standard information technology security measures may be applied to ensure all aspects of the secure data services server 108 are protected from unauthorized access.

In some embodiments, the application server 112 is a computing device configured to provide application services (e.g., mapping services, notification/ messaging services, etc.) to a number of client devices. In some embodiments, the application server 112 includes a processor 222, an input/output module 224, and memory 226. The application server 112 may include various types of computing components that execute an operating system. The processor 222 may execute instructions, including instructions stored in the memory 226. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 224 of the application server 112 may include an input module, such as a radio frequency sensor, a keyboard, a touch screen, and/or a mouse, and an output module, such as a radio frequency transmitter, a printer, and/or a monitor. The application server 112 may be connected to a local area network (LAN) or a wide area network (e.g., the Internet) via a network interface connection. In some embodiments, the input/output module 224 may take other forms.

Further, the application server 112 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device.

In some embodiments, the memory 226 includes a response module 228, an asset/personnel module 230, a modeling module 232, and a GIS module 113. The aforementioned components of the application server 112 may be implemented on multiple computing devices (i.e., servers), where a load balancing scheme distributes requests across the multiple computing devices. For example, the GIS module 113 may be implemented as a separate GIS server as shown in FIG. 1. In this example, the GIS server may access output of the application server 112 via the spatial data repository 110.

In some embodiments, the response module 228 of the application server 110 is configured to provide services to emergency responders during an emergency response. For example, the response module 228 may provide planning services, inventory services, mapping services, etc. for fluid spill responders during a fluid spill. In this example, the response module 228 may present output such as maps, inventories, status updates associated with a fluid spill to responder(s) or executive stakeholder(s) (114 of FIG. 1). The response module 228 may allow for responders to collaborate and to develop strategies during an emergency response. In some embodiments, the response module 228 is configured to consolidate output from other modules (e.g., asset/personnel module 230, modeling module 232, map module 234) of the application server 112 into a single application for use by the emergency responders. For example, the response module 228 may be provided as a web application that is accessible by emergency responders over the Internet through a web browser displayed on a wall display of an emergency response center 115. In another example, the response module 228 may provide backend services that are securely consumed by a custom client executing on personal computing device(s) of responders (116) such as desktop computers, laptop computers, smartphones, etc.

In some embodiments, the asset/personnel module 230 of the application server 110 is configured to track the status of assets (e.g. vessels, holding tanks, or oil spill booms) and personnel during an emergency response. For example, the asset/personnel module 230 may maintain data records corresponding to assets and personnel deployed for an emergency response. In this example, each data record may include a descriptive identifier, geographical location (i.e., coordinates), timestamp, status, etc. for a corresponding response asset or response personnel. As discussed above, the exact location of an asset or personnel may be received from a tracking device affixed to the asset or personnel. In this manner, the exact, real-time location of deployed assets and personnel may be monitored during an emergency response.

In some embodiments, the modeling module 232 of the application server 112 is configured to determine the location, shape, and movement of a fluid spill. Specifically, the modeling module 232 may be configured to determine the location of a fluid spill based on location data received from a number of tracking devices deployed in the fluid spill (e.g., tracking deployed in the center and along the perimeter of the fluid spill). In this case, the modeling module 232 may flexibly calculate the location and shape of the fluid spill based on various spatial-statistical modeling algorithms. For example, the physical extent of the fluid spill may be calculated as (1) a concave hull polygon; (2) the center of gravity of the deployed tracking devices; (3) the center of minimum distance of the tracking devices; (4) the average longitude and latitude of the tracking devices on the leading face of the fluid spill.

In some embodiments, the concave hull process may be used to generate a concave hull polygon that closely approximates the location and shape of a fluid spill. In this case, the set of points from the tracking devices deployed in the fluid spill may be used to generate the concave hull polygon. For example, a concave hull process may be based on a k-nearest approach that classifies each point in the set of points based on the majority vote of its neighbors. In this example, different selections of k may be made to generate various concave hull polygons (e.g., a higher number k results in a smoother polygon). The k-nearest approach is described in Adrian et al., *Concave hull a k-nearest neighbours approach for the computation of the region occupied by a set of points*, INSTICC Press published on Mar. 8, 2007, which is incorporated by reference herein in its entirety.

In another example, the concave hull process may be based on a shaving exterior edges approach. An exemplary algorithm for the shaving exterior edges approach is described below:

Generate the Delaunay triangulation of the set of points P.

Remove the longest exterior edge from the triangulation such that (1) the edge removed is longer than a length parameter 1 and (2) the remaining exterior edges of the triangulation form a simple polygon Repeat removing the longest exterior edge so long as there are edges that satisfy the criteria above.

Return the polygon formed by the exterior edges of the triangulation.

The shaving exterior edges approach is described in Duckham et al., *Efficient generation of simple polygons for characterizing the shape of a set of points in the plane*, Pattern Recognition v41 published on Jan. 11, 2008, which is incorporated by reference herein in its entirety.

In some embodiments, the modeling module 232 of the application server 112 is configured to determine trajectories for response maps. Specifically, the modeling module 232 may be configured to determine a trajectory based on historical and current locations and environmental factors such as sea currents, wind direction and velocity, water temperature, surface pressure, etc. For example, real-time sea current data may be collected by tracking devices (102A, 102N of FIG. 1) deployed in a fluid spill. In this example, the trajectory of the fluid spill may be at least partially determined according to the average velocities and directions detected by the tracking devices deployed in the fluid spill. Alternatively, the velocity and direction detected by each of the tracking devices may be considered individually to forecast how the fluid spill may spread in different directions. In this case, tracking devices may be deployed along the entire perimeter of the fluid spill in order to collect movement information in all possible directions.

The modeling module 232 may generate spill trajectories in a 3D fluid model that accounts for various environmental conditions such as hydrodynamic data, wind data, and fluid characteristics. In some embodiments, hydrodynamic data may be collected directly by one or many tracking devices (102A, 102N of FIG. 1) deployed directly into the spill. Supplemental wind data may be collected from weather forecasting services, offshore buoys, offshore weather stations, etc. Fluid characteristics (e.g., density, composition, viscosity, surface and interfacial tension, etc.) may be determined based on a database of known fluids. For example, the database may include the characteristics of various types of crude oil for forecasting the trajectory of an oil spill.

In some embodiments, the GIS module 113 of the application server 112 is configured to render GIS data for display at the enterprise response center(s) 115 and by the personal computing device(s) 116. Specifically, the GIS module 113 may be configured to (1) generate dynamic GIS map displays (i.e., geographic maps) depicting location data stored in the spatial data repository 110; (2) provide the GIS map displays to the enterprise response center(s) 115 and the personal computing device(s) 116; and (3) update the GIS map displays as real-time location data is incorporated into the spatial data repository 110.

In some embodiments, the spatial data manager 236 of the GIS module 113 is configured to extract the position, time and speed measurements of one or numerous tracking devices deployed into a fluid spill. The data from the tracking devices may be provided to the modeling module 232 for aggregation into representative polygons. In this case, the polygons may be provided to the map module 234 thereby enabling a user to visualize the precise movements of the deployed tracking devices, which directly equate to the trajectory of the fluid spill. In some embodiments, standard data animation controls in the map module 232 of the GIS module 113 allow a user to visualize the exact travel path of the fluid spill over a defined time period.

In some embodiments, the historical movement of tracking devices (i.e., position, velocity and time) may be statistically averaged and extrapolated to predict the potential vector of the slick within a short time interval, for example 3 hours. In this case, major changes in weather, currents, tides and other factors driving the tracking devices may be dynamically reflected in the predicted vector.

In some embodiments, the map module 234 of the GIS module 113 is configured to generate maps for providing to a user of the response module 228. In some embodiments, the map module 234 is configured to process user parameters received from the response module 228. For example, the map module 234 may be configured to process the user parameters to identify spatial data (e.g., points of interest, aerial imagery, etc.) for generating the requested maps. In this example, the map module 234 may identify spatial data for building a trajectory map based on user parameters requesting a forecasted trajectory of a fluid spill at a specified location.

In some embodiments, the maps generated by the map module 234 are presented on a user display. For example, the maps may be provided by the response module 228 and then displayed within a web browser of a user. In another example, the maps are transmitted by the response module 228 to a custom client executing on a user device, where the maps are presented on a display screen of the user device.

In some embodiments, the spatial data manager 236 of the spatial data server 208 is configured to manage spatial data stored in the spatial data repository 110. The spatial data manager 236 may be configured to access and modify data in the spatial data repository 110. For example, the spatial data manager 236 may be configured to execute database commands to retrieve or modify database records in the spatial data repository 110. In an exemplary embodiment, the spatial data manager 236 may be used by the other modules (e.g., response module 228, an asset/personnel module 230, a modeling module 232, a map module 234) of the application server 112 to perform spatial or data operations.

In some embodiments, the map module 234 is configured to obtain spatial data (e.g., points of interest, roads, etc.) using the spatial data manager 236 based on user parameters. The spatial data manager 236 may specify a map scale (i.e., a ratio of map distance to corresponding actual distance on the ground) and a map extent (i.e., the outer bounds of the geographic area shown in a map) for a requested map according to the user parameters. For instance, if the user parameters request a detailed map, the spatial data request may specify a larger scale (e.g., one centimeter to 100 meters) and a map extent of a few square kilometers.

In some embodiments, the spatial data manager 236 is configured to also obtain map styles from the spatial data repository 110 for rendering the spatial and temporal data. A map style may specify various rules for rendering spatial data such as label font color, label font size, label position, polyline thickness, fill color of spatial features, etc. Map styles may be defined for map layers, labels, progress bars, symbols, points of interest, routes, or other map features. For example, a trajectory style may specify that known (i.e., historic) should be rendered as a solid line while a forecasted trajectory should be rendered as a dotted line.

In some embodiments, the spatial data manager 236 may be configured to perform spatial operations on spatial data. Examples of spatial operations may include intersecting spatial features, snapping one spatial feature to another, unioning spatial features, buffering a spatial feature, and differencing spatial features. The spatial data manager 236 may perform the spatial operations on spatial data retrieved from the spatial data repository 110. In this case, the results of the spatial operation may be stored in the spatial data repository 110.

In some embodiments, the spatial data manager 236 may be configured to perform spatial comparisons of spatial data. Examples of spatial comparisons may include determining a distance between spatial features, determining whether spatial features intersect, determining whether a spatial feature is contained by another spatial feature, determining whether a spatial feature contains another spatial feature, determining whether spatial features are disjoint, determining whether a spatial feature is equal to another spatial feature, and determining whether a spatial feature touches another spatial feature. The spatial data manager 236 may perform the spatial comparisons on spatial data retrieved from the spatial data repository 110. The spatial data manager 236 may also derive entirely new data through statistical analysis of recorded data, for example by directly extrapolating tracking device positions and velocities to predict the near-future path of a fluid spill.

Figure 3:
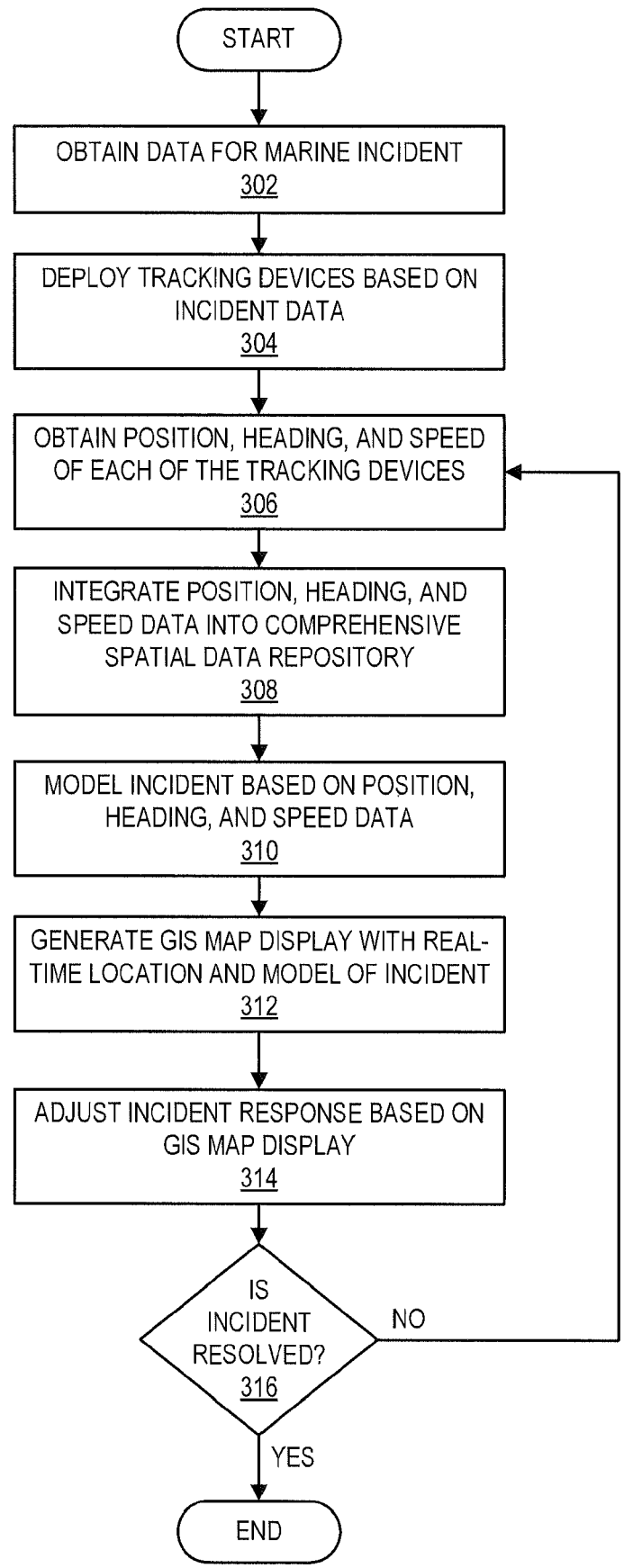
FIGS. 3-4 are flowcharts of methods in accordance with one or more embodiments of the invention.

FIG. 3 shows a flowchart of a method in accordance with one or more embodiments of the invention. More specifically, FIG. 3 is a flowchart of a method for tracking movement in a marine environment. As is the case with the other processes described herein, various embodiments may not include all of the steps described below, may include additional steps, and may sequence the steps differently. Accordingly, the specific arrangement of steps shown in FIG. 3 should not be construed as limiting the scope of the invention.

In 302, initial data for a marine incident is obtained. The initial data may include an initial location, a description of the incident, and a list of involved personnel and assets. For example, an explosion at an offshore rig, a capsized vessel, personnel lost at sea, or a fluid spill may be reported with the preceding information. The initial data may be determined based on visual observations, emergency reports from the incident, communications from responders, vessel logs, etc. Once the initial data for the reported incident is obtained, a response team may be deployed to the initial location of the incident.

In 304, tracking devices are deployed at the incident based on the initial data. For example, the members of the response team may each be equipped with tracking devices to define their location and ensure their safety during the response. In another example, the response team may deploy the tracking devices at or near the initial location of the fluid spill using visual cues (e.g., sheen) and environmental factors such as ocean currents. In some embodiments, the tracking devices may be deployed directly from a helicopter hovering at low altitude.

In 306, position, heading, and speed data is collected by the tracking devices. For example, each of the tracking devices may be configured to periodically (e.g., every 10 minutes, etc.) determine its geographic location, heading, and speed based on location signals received from a positioning device (e.g., GPS satellite, network tower, etc.). Once the data is determined by a tracking device, the position, heading, and speed data may be, transmitted to a data processing satellite, which may then relay the data for eventual incorporation into a spatial data repository (e.g., 110 of FIGS. 1-2). The tracking device may also provide a timestamp to identify the precise time the data was collected and a device identifier to identify the tracking device.

In 308, the position, heading, and speed data is integrated into a comprehensive spatial data repository (e.g., 110 of FIGS. 1-2). The spatial data repository may include spatial data (e.g., aerial images, points of interest, live vessel positions, etc.) for responding to the incident. Specifically, for example, the spatial data repository may include a dynamic point layer that includes representations of the tracking devices deployed in 304. Each point of interest may specify a geographic location, a device identifier corresponding to a tracking device, and a heading and velocity of the tracking device. As the position, heading, and speed data is collected by the tracking device, the data is used to update the corresponding point of interest according to the device identifier in real-time to reflect the exact location of the tracking device at any moment in time. Further, the historical locations of each tracking device may also be stored in the spatial data repository as the corresponding point of interest is updated in real-time. Such historical data may be used for tactical planning and review, for predictive analysis and forecasting, and also for retrospective analysis of the situation during a post-incident critique.

In 310, a model of the marine incident is generated based on the position, heading, and speed data. Specifically, the model of the marine incident may be generated on the historical and current location of one or more combinations of tracking devices. For example, the monitored location of responders may be used to determine an estimated time of arrival at the marine incident. In another example, the historical and current locations of a fluid spill may be extrapolated and used to determine the likely path of the fluid spill as discussed below with respect to FIG. 4.

In some embodiments, notifications may be generated based on the information received from the tracking devices. For example, if an SOS signal has been received from a tracking device, the GIS map display discussed below may depict an SOS notification adjacent to a representation of an emergency responder that initiated the SOS signal. In this example, the emergency responder may be located and retrieved based on the exact location data received from the responder's tracking device. In another example, if a low battery notification has been received from a tracking device, the GIS map display discussed below may depict a low battery notification adjacent to a representation of the tracking device.

In 312, a GIS map (i.e., geographic map) display is generated using the spatial data repository (e.g., 110 of FIGS. 1-2), where the GIS map display shows real-time locations of one or more tracking devices and the model of the marine incident. In some embodiments, the GIS map display may depict extensive real-time data displays such as live helicopter and vessel positions, containment boom placements, and so forth. Such data may be retrieved by separate computer processes that each update the spatial data repository and execute various software modules hosted within an enterprise application server (e.g., 112 of FIGS. 1-2).

In 314, the emergency response may be modified based directly on the GIS map display generated in 312. For example, response assets and/or personnel may be deployed based on the model of the marine incident and the notifications shown in the GIS map display.

In 316, a determination is made as to whether the fluid spill incident is resolved. If the incident is not resolved, the method may continue to 306. If the incident is resolved, the method may end. At this stage, the tracking devices may be retrieved and prepared for storage (e.g., disassembled, batteries removed, cleaned, etc.) until the devices are needed for a subsequent fluid spill.

Figure 4:
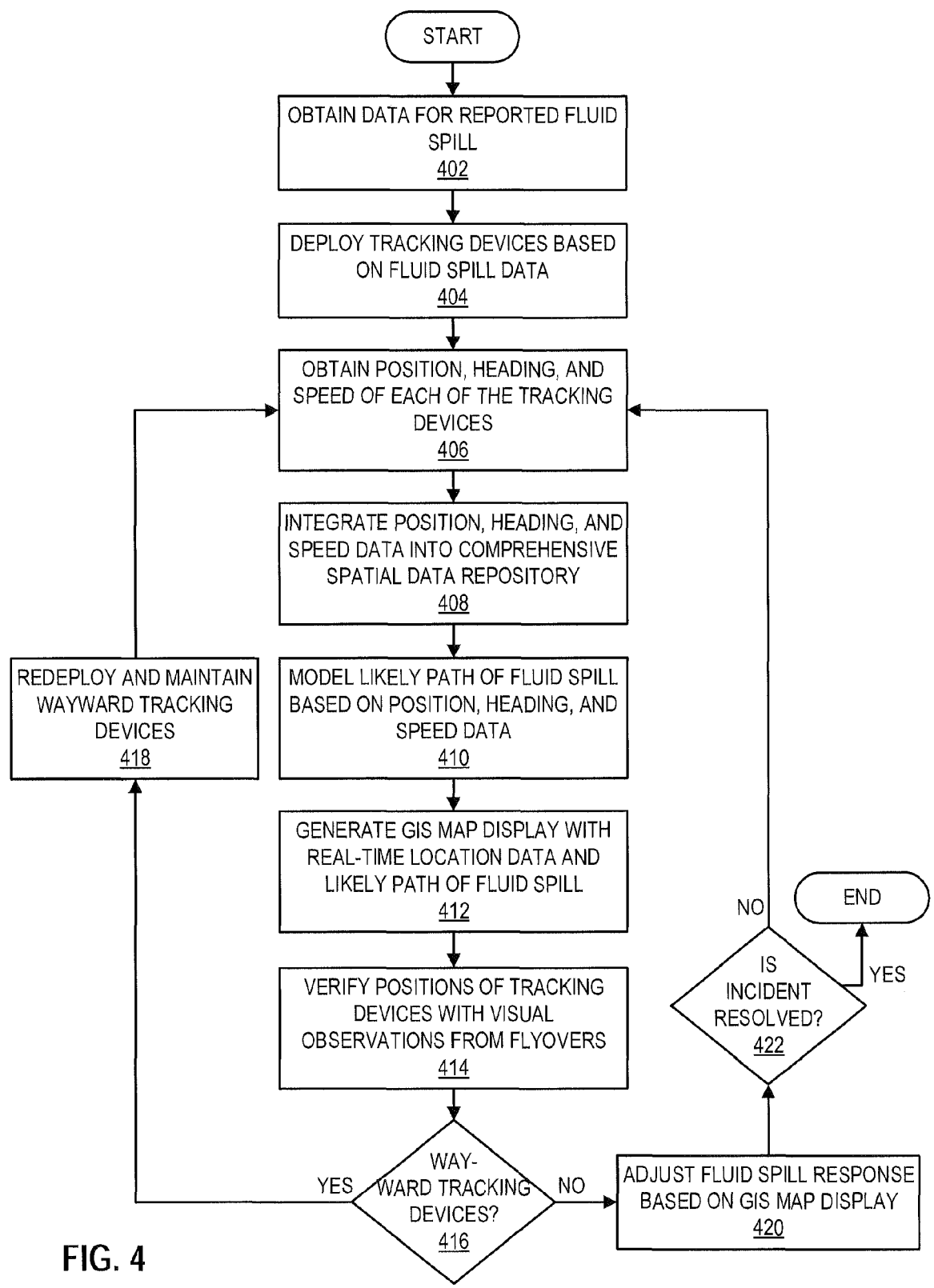

FIG. 4 shows a flowchart of a method in accordance with one or more embodiments of the invention. More specifically, FIG. 4 is a flowchart of a method for tracking a fluid spill when moving with water flow. The movement of the fluid spill may be tracked for a fluid spill response or for other purposes. As is the case with the other processes described herein, various embodiments may not include all of the steps described below, may include additional steps, and may sequence the steps differently. Accordingly, the specific arrangement of steps shown in FIG. 4 should not be construed as limiting the scope of the invention.

In 402, initial data for a reported fluid spill is obtained. The initial data may include an initial location, a known fluid type, an estimated volume, and an estimated slick size of the fluid spill. The initial data may be determined based on visual observations, aerial reconnaissance, vessel log data, etc. Once the initial data for the reported fluid spill is obtained, a spill response team may be deployed to the initial location of the fluid spill.

In 404, tracking devices are deployed at the fluid spill based on the initial data. More specifically, the spill response team may deploy the tracking devices at or near the initial location of the fluid spill using visual cues (e.g., sheen) and environmental factors such as ocean currents. For example, the spill response team may deploy a first set of tracking devices in the center of the fluid spill, a second set of tracking devices in the leading edges of the fluid spill, and a third set of tracking devices in the trailing edges of the fluid spill. Each of the tracking devices has a unique device identifier that is associated with the fluid spill before or during deployment. The unique device identifier may also be associated with the initial deployment zone (e.g., center, leading edges, trailing edges, etc.) of the corresponding tracking device in order to provide additional understanding of the sea current changes and fluid spill movements.

In 406, position, heading, and speed data is collected by the tracking devices. Each of the tracking devices may be configured to periodically (e.g., every 10 minutes, etc.) determine its geographic location, heading, and speed based on location signals received from a positioning device (e.g., GPS satellite, network tower, etc.). Once the data is determined by a tracking device, the position, heading, and speed data may be transmitted to a data processing satellite, which may then relay the data for eventual incorporation into a spatial data repository. The tracking device may also provide a timestamp to identify the exact time the data was collected and a device identifier to identify the tracking device.

In 408, the position, heading, and speed data is integrated into a comprehensive spatial data repository. The spatial data repository may include spatial data (e.g., aerial images, points of interest, etc.) for responding to the fluid spill event. Specifically, for example, the spatial data repository may include a points of interest layer having points of interest for the tracking devices deployed in 404. Each point of interest may specify a geographic location, a device identifier corresponding to a tracking device, and a heading and velocity of the tracking device. As the position, heading, and speed data is collected by the tracking device, the data is used to update the corresponding point of interest according to the device identifiers in real-time to reflect the current location of the tracking device. Further, the historical locations of each tracking device may also be stored in the spatial data repository as the corresponding point of interest is updated in real-time thereby enabling playback and forecasting of likely trajectories.

A subset of the fluid spill may be identified and tracked by determining the tracking devices that were initially deployed in the fluid spill. As discussed above, the deployment location of each tracking device may be associated with the device identifier and a locational identifier within each fluid spill (e.g., 'Spill 1 leading edge', 'Spill 2 center', etc.) when the tracking device is initially deployed. In this case, all deployment location data may be stored in the spatial data repository. The location data collected by fluid-spill subset(s) of the tracking devices may then be retrieved from the spatial data repository and then used to model and report the likely path of the fluid spill(s) at various scales of detail.

In 410, a model of the likely path (i.e. forecasted trajectory) of the fluid spill is generated based on the position, heading, speed, and timestamps of all tracking device(s) deployed into the fluid spill(s). Specifically, the model of the likely path may be generated based on the historical and current locations of the fluid spill. As discussed above, the location of a fluid spill may be determined as the geographic center of a number of tracking devices deployed in the fluid spill. The geographic center of the fluid spill may be monitored over time to determine the historical and current locations of the fluid spill. The historical and current locations of the fluid spill may optionally be used in a 3D fluid model to confirm the likely path of the fluid spill. In this case, the historical locations may be used to verify model outputs. For example, previous forecasted trajectories may be compared to the historical path of the fluid spill to determine the accuracy of the models used. In this example, the models may be updated if it is determined that the previous forecasts were inaccurate. Because the tracking devices provide the actual real-time location of sea currents and fluid spill particles, their data provides a factual basis for tactical planning and response. 3D mathematical models may provide a supplementary information source and means for assessing longer-term "what if" scenarios.

For example, the trajectory and fates model may be used in 410 to predict the movement and weathering of a fluid from instantaneous or continuous spills. Fluids in this model may be represented by a number of individual spillets, where each of the spillets is initialized with an equal proportion of the total fluid mass spilled. In the trajectory and fates model, each of the spillets moves and weathers independently. For example, the model may predict the surface distribution of the spilled fluid and the fluid mass balance (i.e., the amount of oil on the free surface, in the water column, evaporated, on the shore, and removed by mechanical cleaning over time). In this example, the fate processes in the model predict spreading, evaporation, entrainment (i.e., natural dispersion), and emulsification of the fluid. Fluid-shoreline interaction is modeled according to the shore type, which determines holding capacity, and exponential removal rate. The model may also estimate the temporal variation of the fluid's areal coverage, fluid thickness, and fluid viscosity.

A subsurface model, including all the features noted above for the trajectory and fates model, may also be used to predict the movement of subsurface particles. The subsurface fluid concentration field may be predicted using a particle based, random walk technique and includes fluid droplet rise velocities by size class. Resurfacing of fluid droplets due to buoyant force may also be considered, resulting in new surface slicks.

A stochastic and receptor model may also perform multiple simulations that randomly vary the environmental data (e.g., wind, currents, etc.) used to predict the movement of the fluid. In this case, the stochastic model predicts where oil is likely to be if released at a particular location, and the receptor model predicts where oil would have originated in order to arrive at a particular location. In some embodiments, the stochastic and receptor models generate contour maps showing the probability of surface fluid and travel time contours. Shoreline data or other resource location information stored in a spatial data repository such as an enterprise GIS system may be used in the stochastic model to determine the probability of fluid contacting the shoreline or critical resources.

In some embodiments, fluid thickness contours may be included in the forecasted trajectories. The thickness contours may be determined according to a Gaussian spreading algorithm that sums the contributions of individual spillets and accounts for limitations to spreading caused by nearby land masses. The contours may be displayed as gridded data that is color coded to represent the range of oil thicknesses.

In some embodiments, the results of any optional 2D or 3D fate models may be compared directly against the actual paths of tracking devices and, if necessary, re-calibrated based on the sensor positions. Should results continue to conflict, decision makers may consider the tracking devices to be definitive. In some embodiments, responders may opt to pre-deploy a number of sensors at strategic distances ahead of the fluid spill (e.g., 5, 10, 50, or 100 kilometers ahead of the spill). Pre-deployment may provide advanced awareness of the true sea currents operating in the 'pending' path of the spill. Importantly, in this example, responders and executive stakeholders may monitor the advance-deployed sensors to pragmatically determine—with a high degree of certainty—whether or not the fluid spill is likely to arrive at the shoreline. To account for changing tidal and weather conditions, such proactive tracer tests may be executed at various times throughout a given day. In this example, any tracking devices pre-deployed in this manner may be configured with a suitable mission identifier to instantly differentiate the pre-deployed devices from tracking devices deployed in the actual fluid spill.

In 412, a GIS map (i.e., geographic map) display is generated using the location data from the spatial data repository, where the GIS map display shows a real-time location and the likely path of the fluid spill. Previous spill paths may also be displayed to indicate longer-term movement patterns. The present, real-time location of the fluid spill may be represented using a variety of mathematical and cartographic display techniques. For example, the full extent of the spill could be calculated using the concave hull methods discussed above with respect to FIG. 2. The velocity and overall path of the spill(s) may be portrayed as a single vector, which averages the detected directions and velocities of the tracking devices deployed in the fluid spill in 404.

In some embodiments, the GIS map display may depict notifications that are generated based on the information received the tracking devices. For example, if a low battery notification has been received from a tracking device, the GIS map display may depict a low battery notification adjacent to a representation of the tracking device. In this example, the tracking device may be retrieved and maintained to ensure continued operation of the device before redeploying the tracking device into the fluid spill in 418. In another example, an impact notification may be depicted in the GIS map display when it is determined that any of the tracking devices is within a predetermined distance of a critical location. Examples of critical locations may include water intakes, seaports, beaches, etc. If an impact notification has been received for a tracking device, the fluid spill response may be modified based on the impact notification in 420. For example, spill response assets or personnel may be deployed to the geographic location of the tracking device associated with the impact notification. In this example, the spill response assets and personnel may also be equipped with tracking devices such that their locations are depicted in the GIS map display, allowing nearby assets and personnel to be optimally positioned to respond to the impact notification.

In one or more embodiments, other notifications may be generated based on data obtained by the tracking devices. For example, the velocity of the tracking devices may be monitored and transmitted for storage in the spatial data repository. In this example, a sea-conditions notification may be generated if the average velocity of the tracking devices changes by a predetermined percentage. The change in average velocity may indicate that there is a significant change in sea conditions. Similar to as discussed above, the fluid spill response may be adjusted in response to a sea-conditions notification in 420.

In one or more embodiments, a spill response vessel may be equipped with a tracking device to report the vessel's location during the spill response. In this case, smaller vessels may be monitored simultaneously with larger vessels, which under international maritime law are required to broadcast their position using Automatic Identification System (AIS) transponders. In this example, all vessel data may be incorporated into the spatial data repository for visualization in the GIS system.

In one or more embodiments, a tracking device may be configured to track and report the position and status of helicopters, fixed wind aircraft, and other tactically important assets deployed during the spill.

In 414, the positions of the tracking devices are verified with visual observations obtained by aerial flyovers. More specifically, the aerial flyovers may provide geo-referenced imagery of the fluid spill, which may be overlaid on the geographic locations of the tracking devices in the GIS map display generated in 412. Wayward tracking devices no longer inside the perimeter of the fluid spill may be identified using the GIS map display and the aerial imagery.

In 416, a determination is made as to whether there are any wayward tracking devices. If there is a wayward tracking device, the wayward tracking device is retrieved and redeployed inside the perimeter of the fluid spill in 418. While redeploying the tracking device, the tracking device may also be maintained (e.g., replace battery, modify ballast, etc.) to ensure continued operation of the device. For example, the ballast may be adjusted so that the tracking device remains within the fluid spill perimeter.

In 420, the spill response may be modified based on the GIS map display generated in 412. For example, spill response assets and/or personnel may be deployed based on the movement of the fluid spill and the notifications shown in the GIS map display.

In 422, a determination is made as to whether the fluid spill incident is resolved. If the incident is not resolved, the method may continue to 406. If the incident is resolved, the method may end. At this stage, the tracking devices may be retrieved and prepared for storage (e.g., disassembled, batteries removed, cleaned, etc.) until the devices are needed for a subsequent fluid spill.

Figure 5A:
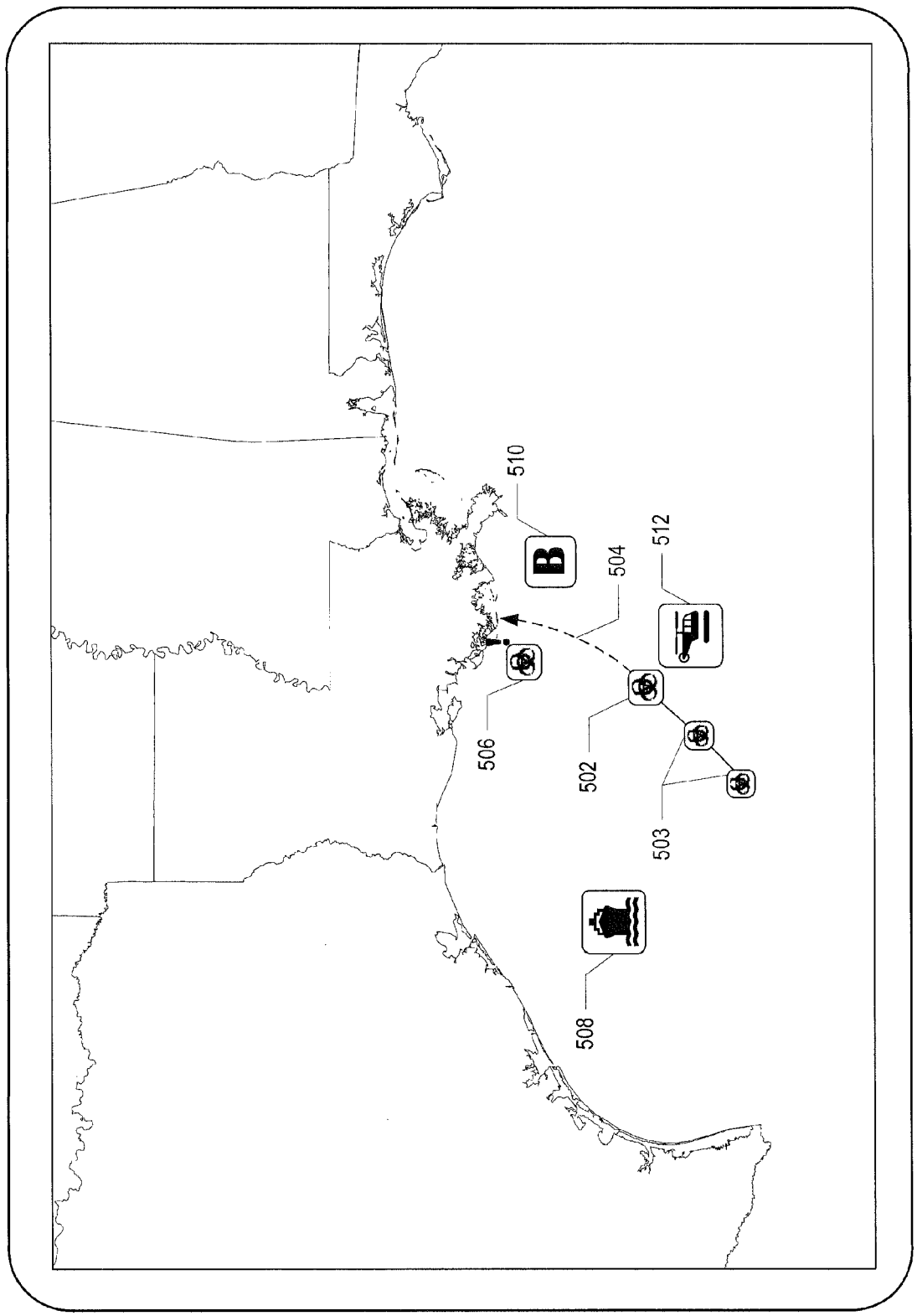
FIGS. 5A-5D are example displays of a system in accordance with one or more embodiments of the invention.

FIGS. 5A, 5B, 5C, and 5D show example displays of a system in accordance with one or more embodiments of the invention. FIG. 5A shows an example trajectory map generated by an application server 112 as discussed above. The example map includes historical locations 503 and a current location 502 of a fluid spill. From the current location 502, a forecasted trajectory vector 504 of the fluid spill is shown. As discussed above, the forecasted trajectory vector 504 may be determined using a combination of historical tracking device locations 503, current location 502, and pre-deployed tracking devices as inputs. In this example, the predicted results of 3D fluid models may also be depicted on the display where appropriate. FIG. 5A also shows a tracking device with an imminent contact notification 506. The imminent contact notification 506 informs the user that a pre-deployed tracking device 506 is within a predetermined distance of a critical location, which in this case is a sea-water intake for a refinery. The pre-deployed tracking device 506 confirms that the predicted trajectory path of the spill 504 is realistic and that the refinery intakes should certainly be protected.

The trajectory map of FIG. 5A also shows the location of assets (e.g., fluid spill vessel 508, boom 510, helicopter 512) deployed in the area. Each of the assets (e.g., fluid spill vessel 508, boom 510, helicopter 512) may be equipped with a tracking device as discussed above. The fluid spill vessel 508 and helicopter 512 may also be equipped with an automatic identification system transponder, where both the transponder and tracking device are used to verify the location of the fluid spill vessel 508 and helicopter 512, respectively. The trajectory map may also be used by emergency responders to deploy the assets (e.g., fluid spill vessel 508, boom 510, helicopter 512) based on the trajectory 504 of the fluid spill. For example, the helicopter 512 may be requisitioned to obtain aerial imagery of the fluid spill based on the helicopter's 512 proximity to the current location 502. In another example, the boom 510 may be collected and redeployed in the trajectory 504 of the oil spill based on the trajectory map.

Figure 5B:
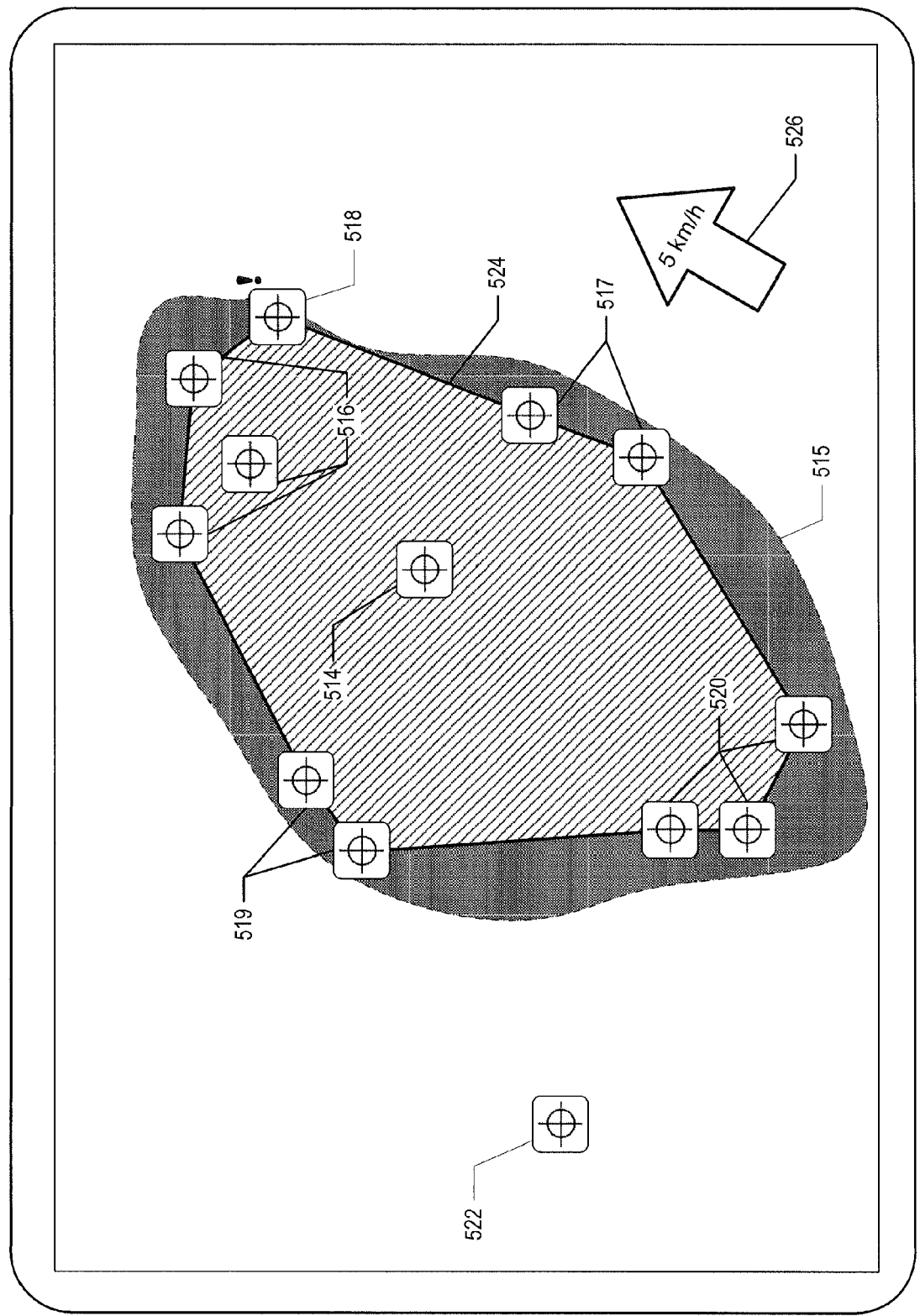

In FIG. 5B, a larger scale (i.e., increased detail) portion of the trajectory map of FIG. 5A is shown. The larger scale of the trajectory map allows for the individual tracking devices (e.g., central tracking device 514, leading tracking devices 516 and 518, trailing tracking devices 520, left side tracking devices 519, right side tracking devices 517) to be represented on the map. The central tracking device 514 is shown as maintaining its position near the center of the fluid spill, which is represented by aerial imagery 515 on the trajectory map. The leading tracking devices 516 and 518 are also shown as maintaining their position within the perimeter of the fluid spill 515. Further, one of the tracking devices in the leading edge is shown with a low battery indicator 518. Based on the low battery indicator 518 shown in the trajectory map, the tracking device 518 may be retrieved and maintained to ensure continued operation.

Three of the tracking devices in the trailing edge 520 are shown as maintaining their position within the perimeter of the fluid spill 515. However, a wayward device 522 is also shown outside the perimeter of the fluid spill 515 near the trailing edges. Based on the trajectory map, the wayward device 522 may be retrieved and redeployed within the perimeter of the fluid spill 515. The left side tracking devices 519 and right side tracking devices 517 are shown as maintaining their position on their respective sides of the fluid spill 515.

Based on the locations of the tracking devices (central tracking device 514, leading tracking devices 516 and 518, trailing tracking devices 520, left side tracking devices 519, right side tracking devices 517) in the fluid spill 515, a concave hull polygon 524 approximating the shape of the fluid spill 515 is shown. The trajectory map also includes a directional vector 526 depicting the general direction and velocity of the fluid spill 515. In this example, the directional vector 526 may be determined by averaging the velocity and direction detected by each of the tracking devices (central tracking device 514, leading tracking devices 516 and 518, trailing tracking devices 520, left side tracking devices 519, right side tracking devices 517), excluding the wayward device 522.

Figure 5C:
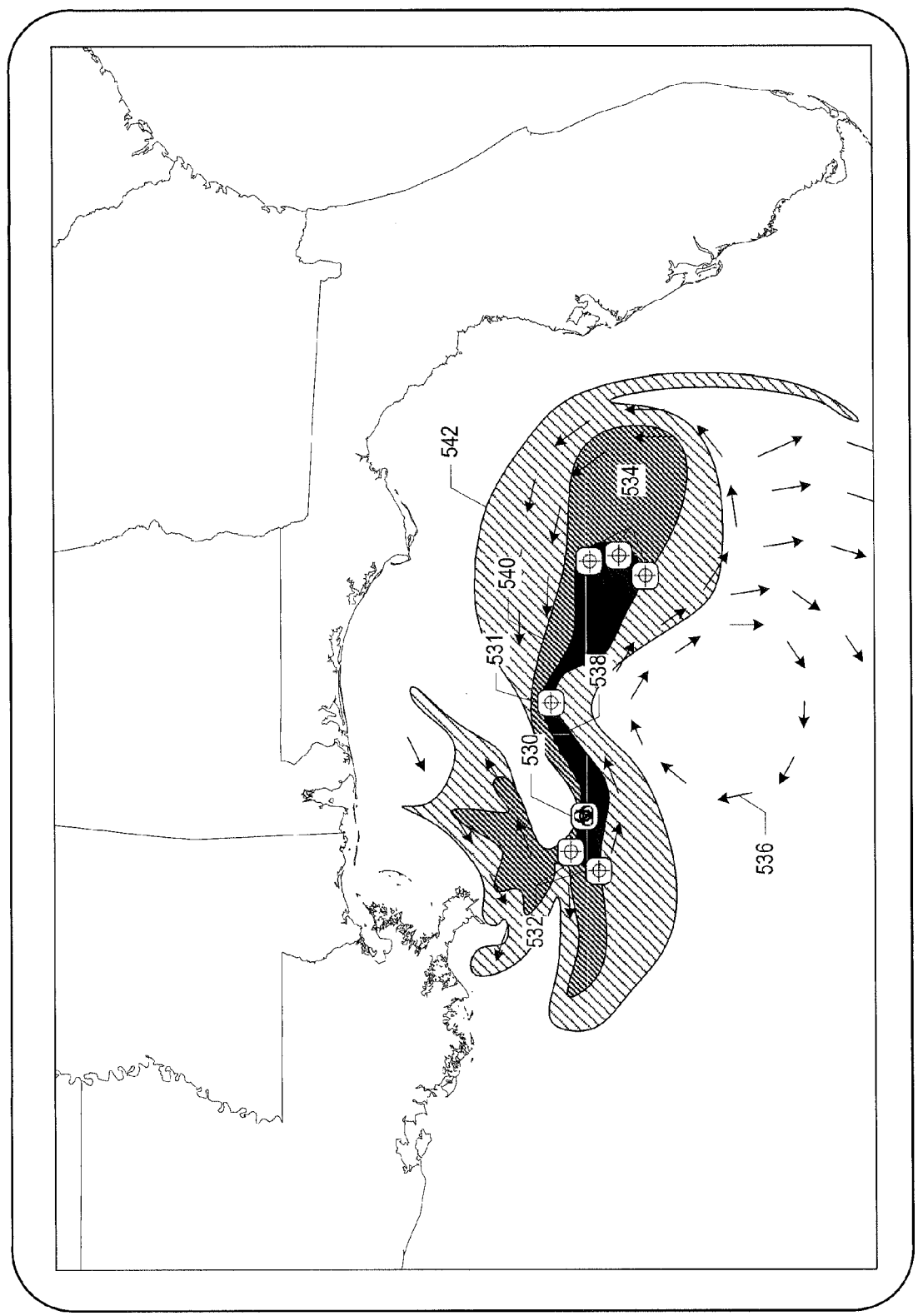

In FIG. 5C, a spill trajectory map including time progression contours is shown. The initial, reported location of the fluid spill 530 is shown in the current fluid spill contour 538, which shows the current perimeter of the fluid spill. A central tracking device 531 that was initially deployed at the reported location of the fluid spill 530 has drifted to the east due to sea currents 536. Trailing tracking devices 532 are shown in the trailing edge of the current fluid spill contour 538. Leading tracking devices 534 are also shown in the leading edge of the current fluid spill contour 538. In this example, each of the trailing tracking devices 532 and the leading tracking devices 534 may be configured with an appropriate amount of ballast to ensure that the tracking device remains in its deployed area. Specifically, each of the trailing tracking devices 532 may include an increased amount of ballast to ensure that the trailing tracking devices 532 remain with the heavier fluids in the trailing edge of the fluid spill, and each of the leading tracking devices 534 may include an decreased amount of ballast to ensure that the leading tracking devices 534 remain with the lighter fluids in the leading edge of the fluid spill.

Based on the monitored location data of the tracking devices 531, 532, and 534, time progressed contours 540, 542 are shown at forecasted intervals (e.g., forecasted fluid spill six hours from current time 540, forecasted fluid spill twelve hours from current time 542). As additional location data is collected by the tracking devices 531, 532, and 534 (along with pre-deployed warning sensors), the forecasted contours 540, 542 may be continually updated and refined, and the likely trajectory calculation adjusted. Results of 3D fluid modeling may also be displayed in the map display for reference purposes. Using standard time-animation tools, users may automatically visualize the past, present, and predicted changes in the spill trajectory on a digital GIS map display.

Figure 5D:
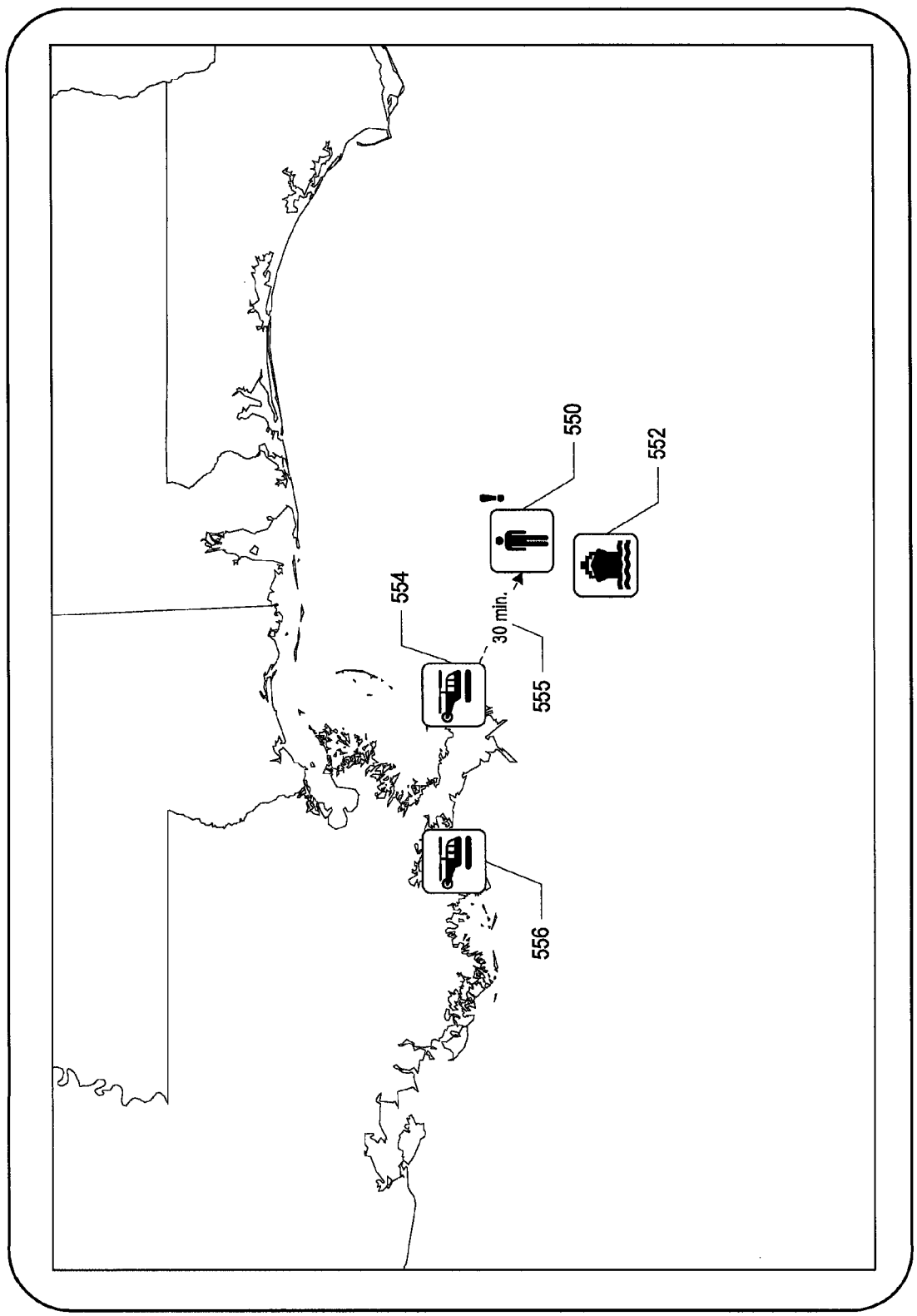

In FIG. 5D, a distress map depicting a man overboard 550 is shown. The predicted location of the man overboard 550 is shown as drifting north from the vessel 552 that deployed the tracking device in response to the man falling overboard. In this example, a tracking device is deployed as soon as possible after the man falls into the sea so that the movement of the tracking device may be monitored. The tracking device reveals localized sea surface currents and helps to determine the predicted location of the man overboard 550. In some embodiments, the deployed tracking device may be configured with ballast so that it better simulates the movement of a person in the sea. Nearby helicopters 554, 556 that are available for an emergency response to recover the man overboard 550 are shown. The nearer helicopter 554 also shows an estimated travel time before arrival 555 if the nearer helicopter 554 is deployed to recover the man overboard 550.

Figure 6:
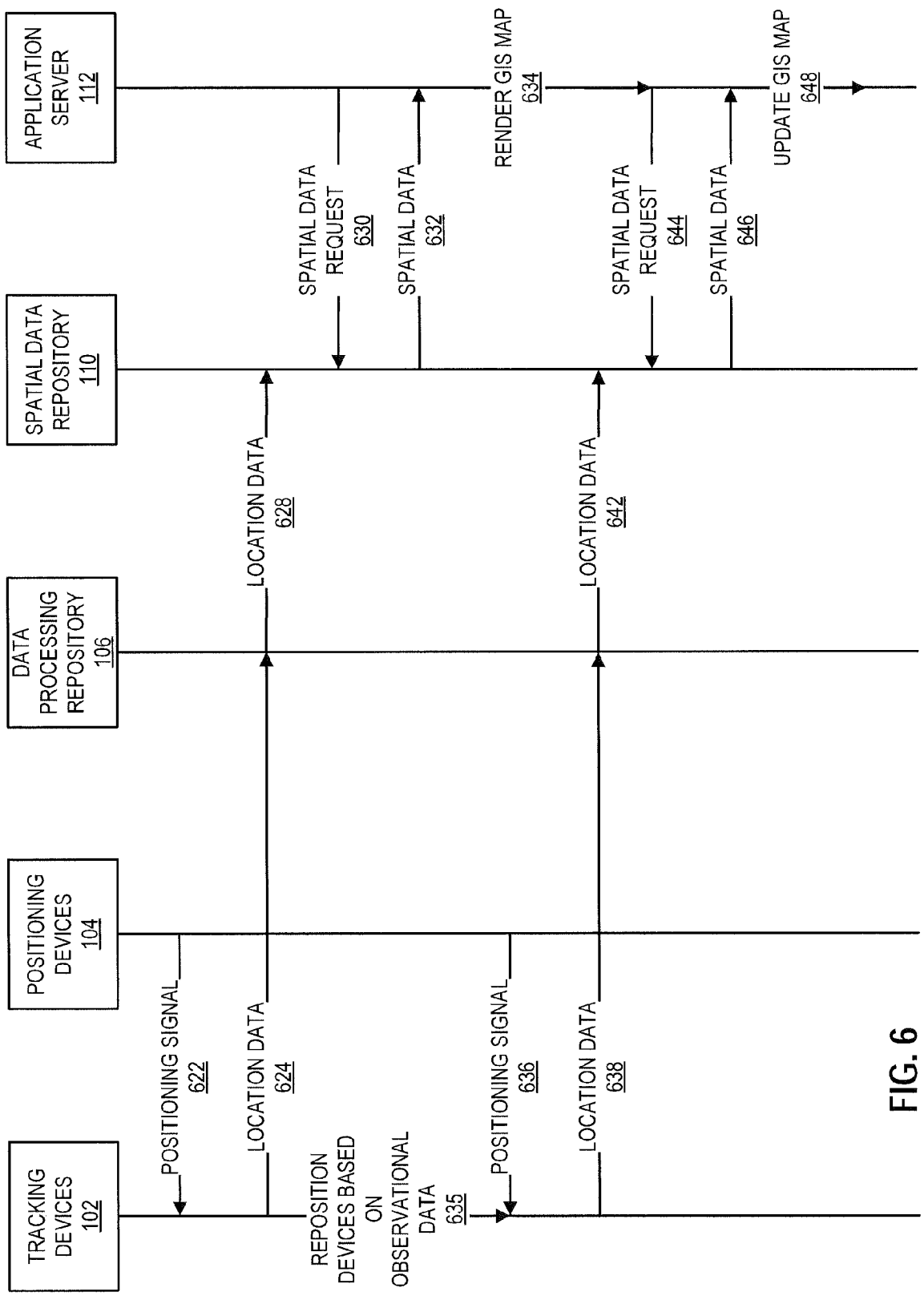
FIG. 6 is a data flowchart of a method in accordance with one or more embodiments of the invention.

FIG. 6 shows a data flow of a method in accordance with one or more embodiments of the invention. More specifically, FIG. 6 shows an example of obtaining a geographic information systems (GIS) map from an application server 112. The example includes tracking devices 102, positioning devices 104, a data processing repository 106, a spatial data repository 110, and an application server 112, which may be substantially similar to their corresponding components discussed above with respect to FIGS. 1 and 2.

In step 622 of the present embodiment, the tracking devices 102 obtain a positioning signal from the positioning devices 104. For example, each of the tracking devices 102 may receive GPS signals from three or more GPS satellites. In this example, each of the tracking devices 102 may use the GPS signals to determine the current location of the tracking device 102. The GPS signals may also be used by the tracking device 102 to determine other location data such as the bearing or the velocity of the tracking device 102.

In step 624 of the present embodiment, activated tracking devices 102 provide their location data (e.g., geographic locations, bearing, timestamp and velocity of the tracking devices) to the data processing repository 106. For example, the location data may be relayed through a data processing device such as the GLOBALSTAR™ constellation. In this example, the data processing device is configured to store the location data in the data processing repository 106.

In step 628 of the present embodiment, the location data is incorporated into the spatial data repository 110. For example, the location data may be obtained from the data processing repository 106 by secure data services and then stored in the spatial data repository 110. In this example, the source and the format of the location data may be automatically verified as the data is incorporated into the spatial data repository 110.

Alternatively to steps 624 and 628, the location data may be directly transmitted from the tracking devices 102 to the spatial data repository 110.

In step 630 of the present embodiment, a spatial data request is received by the spatial data repository 110 from the application server 112. For example, the spatial data request may be generated by the application server 112 responsive to a user requesting a GIS map (i.e., geographic map) display. In this example, the spatial data request may request a trajectory map in a region selected by the user.

In step 632 of the present embodiment, spatial data is retrieved from the spatial data repository 110 by the application server 112. Examples of spatial data include (1) a points of interest layer with points corresponding to the tracking devices; (2) aerial imagery of the fluid spill; (3) a shoreline polygon layer with polygons corresponding to counties, states, provinces, or countries; (4) a layer of points representing the live location of vessels or helicopters, which are transmitted through onboard transponders; etc.

In step 634 of the present embodiment, a GIS map display is rendered using the spatial data obtained in 632. For example, a trajectory map may be generated based on the historical, present, or predicted locations of a fluid spill. In this example, the trajectory map may also include a trajectory of the fluid spill that is generated according to a 3D fluid model. The trajectory map may also display an aerial image of the fluid spill and locations of the tracking devices, where the tracking device locations are synchronized to the aerial image based on the timestamps of the locations (i.e., overlaying historic locations of the tracking devices with timestamps that correspond to the time that the aerial image was captured).

In step 635 of the present embodiment, wayward tracking devices may be repositioned based on observational data. Specifically, wayward devices may be identified on the GIS map display as tracking devices outside the perimeter of the aerial image of the fluid spill. The wayward devices may be retrieved and redeployed inside the perimeter of the fluid spill.

The tracking devices 102 may periodically (e.g., every 10 minutes) generate location data for generating GIS map displays. Accordingly, the process described above may be repeated in steps 636-648 to update the GIS map display with the latest location data of the tracking devices 102. In this case, the previous location of the fluid spill shown in the map generated in 634 may be stored as a historical location of the fluid spill, where the trajectory of the fluid spill is updated in 648 in view of the new location of the fluid spill. The GIS map display may be continually updated with the real-time locations of the tracking devices until the fluid spill incident is resolved. In this example, the current location of the fluid spill shown in the GIS map display of step 648 may be more accurate because any wayward devices have been redeployed in the perimeter of the fluid spill.

This application and this invention relate to co-pending U.S. Non-provisional patent application Ser. No. 13/454,812, by O'Regan et al, titled "Method and Tracking Device for Tracking Movement in a Marine Environment," filed on Apr. 24, 2012, the disclosure of which is incorporated by reference herein in its entirety.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

The invention claimed is:

1. A computer implemented method to track fluid spills when moving with water flow, the method comprising:
    obtaining location data for each of a plurality of tracking devices from a positioning satellite data repository, each of the plurality of tracking devices configured to move freely with a fluid spill on the sea surface so as to drift and travel with the fluid spill therealong the sea surface, the location data for each of the respective plurality of tracking devices including a device identifier of a tracking device, a geographic location of the tracking device, and a timestamp to identify an exact time when the geographic location was obtained;
    integrating the location data of each of the plurality of tracking devices into a spatial data repository according to the device identifier;
    determining, by one or more processors, a deployment location for each of the plurality of tracking devices based on the device identifier;
    identifying, by the one or more processors and responsive to the deployment location of each of the plurality of tracking devices, a fluid-spill subset of the plurality of tracking devices that were deployed in the fluid spill;
    determining, by the one or more processors, a fluid spill location of the fluid spill based on the geographic locations of the fluid-spill subset; and
    generating, by the one or more processors, a geographic map depicting the fluid spill location.

2. A computer-implemented method as defined in claim 1, wherein the fluid spill location is determined using a concave hull algorithm that is based on a k-nearest approach, and wherein the fluid spill location is depicted as a concave hull polygon that approximates a shape of the fluid spill.

3. A computer-implemented method as defined in claim 1, wherein the location data for each of the respective plurality of tracking devices further includes a velocity and direction of the tracking device, and wherein the computer-implemented method further comprises:
    determining an average velocity and direction for the fluid spill responsive to a velocity and direction obtained from the positioning satellite data repository for each tracking device of the fluid-spill subset; and
    modeling a trajectory vector of the fluid spill responsive to the average velocity and direction of the fluid spill, the geographic map further depicting the trajectory vector of the fluid spill.

4. A computer-implemented method as defined in claim 1, further comprising:
    determining, by the one or more processors, historical fluid spill locations based on historical location data obtained from the positioning satellite data repository for each of the plurality of tracking devices; and
    modeling, by the one or more processors, a trajectory of the fluid spill based on the fluid spill location and the historical fluid spill locations, the geographic map further depicting the trajectory of the fluid spill, and wherein the fluid spill comprises one or more of an oil fluid, a chemical composition fluid, and a hydrocarbon-based fluid.

5. A computer-implemented method as defined in claim 4, further comprising:
    determining, by the one or more processors, an average velocity of the fluid spill based on the fluid spill location and the historical fluid spill locations; and
    transmitting an alert of significant water current changes when the average velocity of the fluid spill changes by a predetermined percentage.

6. A computer-implemented method as defined in claim 4, further comprising:
   identifying, responsive to the deployment location, an asset-tracking device associated with one or more of the plurality of tracking devices that is affixed to a spill response asset, the geographic map further depicting the geographic location of the spill response asset; and
   transmitting, responsive to user input, an action request to reposition the spill response asset based on the trajectory of the fluid spill.

7. A computer-implemented method as defined in claim 4, further comprising:
   transmitting an alert of imminent critical contact when a pre-deployed tracking device of the plurality of tracking devices of the fluid-spill subset is within a predetermined distance of one or more of a plurality of critical locations, wherein the pre-deployed tracking device was deployed a predetermined distance ahead of the fluid spill location in the trajectory of the fluid spill.

8. A computer-implemented method as defined in claim 1, further comprising:
   transmitting an alert of imminent critical contact when any one of the plurality of tracking devices of the fluid-spill subset is within a predetermined distance of one or more of a plurality of critical locations; and
   modifying a fluid spill response responsive to the alert of imminent critical contact, wherein modifying the fluid spill response includes initiating deployment of spill response assets to one or more of the plurality of critical locations.

9. A computer-implemented method as defined in claim 1, further comprising:
   receiving aerial imagery of the fluid spill that is obtained by flyover reconnaissance, the geographic map further depicting the aerial imagery;
   determining that a tracking device of the plurality of tracking devices is outside a perimeter the fluid spill based on the aerial imagery; and
   transmitting an action request to redeploy the tracking device inside the perimeter the fluid spill.

10. A computer-implemented method as defined in claim 1, wherein the method further comprises:
    identifying, based on the deployment location, a personnel-tracking device of the plurality of tracking devices that was deployed at a last known location of a man overboard, the geographic map further depicting the geographic location of the spill responder; and
    generating a distress alert for the man overboard based on a distress signal that is included in the location data for the personnel-tracking device.

11. A computer-implemented method as defined in claim 1, wherein the method further comprises:
    identifying, by the one or more processors, responsive to a low-battery signal that is included in the location data, a tracking device of the plurality of tracking devices having low battery power; and
    transmitting an action request to retrieve and maintain the tracking device having low battery power responsive to the low-battery signal.

12. A system to track fluid spills, the system comprising:
    one or more non-transitory memories;
    one or more processors, each operatively connected to at least one of the one or more non-transitory memories;
    a spatial data repository adapted to store spatial data for a fluid spill response;
    computer-executable program instructions stored on the one or more non-transitory memories and executable by the one or more processors, the computer-executable program instructions comprising:
       a positioning data interface module executed by the one or more processors to obtain location data for each of a plurality of tracking devices from a positioning satellite data repository, each of the plurality of tracking devices configured to move freely with a fluid spill on the sea surface so as to drift and travel with the fluid spill therealong the sea surface, the location data for each of the respective plurality of tracking devices including a device identifier of a tracking device, a geographic location of the tracking device, and a timestamp to identify a time when the geographic location was obtained,
       a spatial data interface module executed by the one or more processors to integrate the location data of each of the plurality of tracking devices into the spatial data repository according to the device identifier,
       a spatial data manager module executed by the one or more processors to:
          determine a deployment location for each of the plurality of tracking devices responsive to the device identifier, and
          identify, responsive to the deployment location of each of the plurality of tracking devices, a fluid-spill subset of the plurality of tracking devices that were deployed in the fluid spill,
       a modeling module executed by the one or more processors to determine a fluid spill location of the fluid spill based on the geographic locations of the fluid-spill subset, and
       a map module responsive to the modeling module and being executed by the one or more processors to generate a geographic map depicting the fluid spill location; and
    a user display associated with the one or more processors and being responsive to the map module to display the geographic map to a user.

13. A system as defined in claim 12, wherein the modeling module is configured to determine the fluid spill location by using a concave hull algorithm that is based on a k-nearest approach, and wherein the fluid spill location is depicted as a concave hull polygon that approximates a shape of the fluid spill.

14. A system as defined in claim 12, wherein the location data for each of the respective plurality of tracking devices further includes a velocity and direction of the tracking device, and wherein the modeling module is further executed by the one or more processors to:
    determine an average velocity and direction for the fluid spill responsive to a velocity and direction obtained from the positioning satellite data repository for each tracking device of the fluid-spill subset; and
    model a trajectory vector of the fluid spill responsive to the average velocity and direction of the fluid spill, the geographic map further depicting the trajectory vector of the fluid spill.

15. A system as defined in claim 12, wherein the modeling module is further executed by the one or more processors to:
    determine historical fluid spill locations responsive to historical location data obtained from the positioning satellite data repository for each of the plurality of tracking devices; and
    model a trajectory of the fluid spill responsive to the fluid spill location and the historical fluid spill locations, the geographic map further depicting the trajectory of the fluid spill.

16. A system as defined in claim 15, wherein the computer-executable program instructions further comprise a response module stored on the one or more memories, wherein the response module is executed by the one or more processors to transmit an alert of significant water current changes when an average velocity of the fluid spill changes by a predetermined percentage; and
 wherein the modeling module is further executed by the one or more processors to determine the average velocity of the fluid spill responsive to the fluid spill location and the historical fluid spill locations.

17. A system as defined in claim 15, wherein the computer-executable program instructions further comprise a response module stored on the one or more memories, wherein the response module is executed by the one or more processors to transmit, responsive to user input, an action request to reposition a spill response asset, the reposition of the spill response asset being responsive to the trajectory of the fluid spill; and
 wherein the spatial data manager is further executed by the one or more processors to identify, responsive to the deployment location, an asset-tracking device of the plurality of tracking devices that is affixed to the spill response asset, the geographic map further depicting a geographic location of the spill response asset.

18. A system as defined in claim 15, wherein the computer-executable program instructions further comprise a response module stored on the one or more non-transitory memories, and wherein the response module is executed by the one or more processors to transmit an alert of imminent critical contact when a pre-deployed tracking device of the plurality of tracking devices is within a predetermined distance of at least one of a plurality of critical locations; and
 wherein the pre-deployed tracking device was deployed a predetermined distance ahead of the fluid spill location in the trajectory of the fluid spill.

19. A system as defined in claim 12, wherein the computer-executable program instructions further comprise a response module stored on the one or more non-transitory memories, and wherein the response module is executed by the one or more processors to transmit an alert of imminent critical contact when any tracking device of the fluid-spill subset is within a predetermined distance of at least one of a plurality of critical locations and to modify a fluid spill response responsive to the alert of imminent critical contact, wherein modifying the fluid spill response includes initiating deployment of spill response assets to at least one of the plurality of critical locations.

20. A system as defined in claim 12, wherein the computer-executable program instructions further comprise a response module stored on the one or more memories, and wherein the response module is executed by the one or more processors to transmit an action request to redeploy a wayward device of the plurality of tracking devices inside a perimeter of the fluid spill, wherein the spatial data manager is further executed by the one or more processors to receive aerial imagery of the fluid spill that is obtained by flyover reconnaissance, the geographic map further depicting the aerial imagery, and wherein the modeling module is further executed by the one or more processors to determine that the wayward device of the plurality of tracking devices is outside the perimeter the fluid spill based on the aerial imagery.

21. A system as defined in claim 12, further comprising the plurality of tracking devices, the positioning satellite repository, and a positioning satellite receiver positioned in communication with the one or more processors to receive the positioning satellite data to be stored in the positioning satellite repository, each tracking device of the plurality of tracking devices comprising:
 a receiver adapted to receive positioning signals from three or more positioning satellites;
 a transmitter adapted to send the location data to a data processing satellite, the data processing satellite further transmitting the location data for storage in the positioning satellite data repository;
 a processor, operatively connected to the receiver and the transmitter, adapted to generate the location data responsive to the positioning signals;
 a housing having the receiver, the transmitter, and the processor positioned therein; and
 a waterproof container having the housing positioned therein, the waterproof container being adapted to:
  protect the receiver, the transmitter, and the processor by preventing an ingress of water into the waterproof container, and
  float the tracking device on a surface of the fluid spill.

22. A non-transitory computer readable medium having computer-executable program instructions embodied therein that when executed cause one or more computer processors to:
 obtain location data for each of a plurality of tracking devices from a positioning satellite data repository, each of the plurality of tracking devices configured to move freely with a fluid spill on the sea surface so as to drift and travel with the fluid spill therealong the sea surface, the location data for each of the respective plurality of tracking devices including a device identifier of a tracking device, a geographic location of the tracking device, and a timestamp to identify an exact time when the geographic location was obtained;
 integrate the location data of each of the plurality of tracking devices into a spatial data repository according to the device identifier;
 determine a deployment location for each of the plurality of tracking devices responsive to the device identifier;
 identify, responsive to the deployment location of each of the plurality of tracking devices, a fluid-spill subset of the plurality of tracking devices that were deployed in the fluid spill;
 determine a fluid spill location of the fluid spill based on the geographic locations of the fluid-spill subset; and
 generate a geographic map depicting the fluid spill location.

23. A non-transitory computer readable medium as defined in claim 22, wherein the fluid spill location is determined using a concave hull algorithm that is based on a k-nearest approach, and wherein the fluid spill location is depicted as a concave hull polygon that approximates a shape of the fluid spill.

24. A non-transitory computer readable medium as defined in claim 22, wherein the location data for each of the respective plurality of tracking devices further includes a velocity and direction of the tracking device, and wherein the computer-executable program instructions when executed further cause the one or more computer processors to:
 determine an average velocity and direction for the fluid spill responsive to a velocity and direction obtained from the positioning satellite data repository for each tracking device of the fluid-spill subset; and
 model a trajectory vector of the fluid spill responsive to the average velocity and direction of the fluid spill, the geographic map further depicting the trajectory vector of the fluid spill.

25. A non-transitory computer readable medium as defined in claim 22, wherein the computer-executable program instructions when executed further cause the one or more computer processors to:
determine historical spill locations responsive to historical location data obtained from the positioning satellite data repository for each of the plurality of tracking devices; and
model a trajectory of the spill responsive to the spill location and the historical spill locations, the geographic map further depicting the trajectory of the fluid spill.

26. A non-transitory computer readable medium as defined in claim 25, wherein the fluid comprises oil, and wherein the computer-executable program instructions when executed further cause the one or more computer processors to:
determine an average velocity and directional vector of the fluid spill responsive to the fluid spill location and the historical fluid spill locations; and
transmit an alert of significant water current changes when the average velocity of the fluid spill changes by a predetermined percentage.

27. A non-transitory computer readable medium as defined in claim 25, wherein the computer-executable program instructions when executed further cause the one or more computer processors to:
identify, responsive to the deployment location, an asset-tracking device of the plurality of tracking devices that is affixed to a spill response asset, the geographic map further depicting the geographic location of the spill response asset; and
transmit, responsive to user input, an action request to reposition the spill response asset, the reposition being responsive to the trajectory of the fluid spill.

28. A non-transitory computer readable medium as defined in claim 25, wherein the computer-executable program instructions when executed further cause the one or more computer processors to:
transmit an alert of imminent critical contact when a pre-deployed tracking device of the plurality of tracking devices of the fluid-spill subset is within a predetermined distance of one or more of a plurality of critical locations, wherein the pre-deployed tracking device was deployed a predetermined distance ahead of the fluid spill location in the trajectory of the fluid spill.

29. A non-transitory computer readable medium as defined in claim 22, wherein the computer-executable program instructions when executed further cause the one or more computer processors to:
transmit an alert of imminent critical contact when any tracking device of the fluid-spill subset is within a predetermined distance of at least one of a plurality of critical locations; and
modifying a fluid spill response responsive to the alert of imminent critical contact, wherein modifying the fluid spill response includes initiating deployment of spill response assets to at least one of the plurality of critical locations.

30. A non-transitory computer readable medium as defined in claim 22, wherein the computer-executable program instructions when executed further cause the one or more computer processor to:
receive aerial imagery of the fluid spill that is obtained by flyover reconnaissance, the geographic map further depicting the aerial imagery;
determine that a tracking device of the plurality of tracking devices is outside a perimeter of the fluid spill based on the aerial imagery; and
transmit an action request to redeploy the tracking device inside the perimeter of the fluid spill.

31. A non-transitory computer readable medium as defined in claim 22, wherein the computer-executable program instructions when executed further cause the one or more computer processor to:
identify, responsive to the deployment location, a personnel-tracking device of the plurality of tracking devices that was deployed at a last known location of a man overboard, the geographic map further depicting the geographic location of the spill responder; and
generate a distress alert for the man overboard responsive to a distress signal that is included in the location data for the personnel-tracking device.

32. A non-transitory computer readable medium as defined in claim 22, wherein the computer-executable program instructions when executed further cause the one or more computer processors to:
identify, responsive to a low-battery signal that is included in the location data, a tracking device of the plurality of tracking devices with low battery power; and
transmit an action request to retrieve and maintain the tracking device responsive to the low-battery signal.

33. A fluid spill tracking machine to track fluid spills, the machine comprising:
one or more non-transitory memories;
one or more processors, each operatively connected to at least one of the one or more non-transitory memories;
a spatial data repository adapted to store spatial data for a fluid spill response and being connected to the one or more processors; and
computer-executable program instructions stored on the one or more non-transitory memories and executable by the one or more processors, the computer-executable program instructions comprising:
a positioning data interface module executed by the one or more processors to obtain, in a first process, location data for each of a plurality of tracking devices from a positioning satellite data repository, each of the plurality of tracking devices configured to move freely with a fluid spill on the sea surface so as to drift and travel with the fluid spill therealong the sea surface, the location data including a device identifier, geographic location, and a timestamp,
a spatial data interface module executed by the one or more processors to integrate, in a second process, the location data of each of the plurality of tracking devices into the spatial data repository according to the device identifier,
a spatial data manager module executed by the one or more processors to
determine, in a third process, a deployment location for each of the plurality of tracking devices responsive to the device identifier, and
identify, responsive to the deployment location of each of the plurality of tracking devices, a fluid-spill subset of the plurality of tracking devices that were deployed in the fluid spill,
a modeling module executed by the one or more processors to determine, in a fourth process, a fluid spill location of the fluid spill based on the geographic locations of the fluid-spill subset, and
a map module executed by the one or more processors to generate, in a fifth process, a geographic map depicting the fluid spill location to a geographic information system (GIS) display.

34. A machine as defined in claim 33, wherein the modeling module is further executed by the one or more processors to:
- determine historical fluid spill locations responsive to historical location data obtained from the positioning satellite data repository for each of the plurality of tracking devices; and
- model a trajectory of the fluid spill responsive to the fluid spill location and the historical fluid spill locations, the geographic map further depicting the trajectory of the fluid spill.

35. A machine as defined in claim 34, wherein the computer-executable program instructions further comprise a response module stored on the one or more memories, wherein the response module is executed by the one or more processors to transmit, in a sixth process, an alert of significant water current changes when an average velocity of the fluid spill changes by a predetermined percentage; and
- wherein the modeling module is further executed by the one or more processors to determine the average velocity of the fluid spill responsive to the fluid spill location and the historical fluid spill locations.

36. A machine as defined in claim 34, wherein the computer-executable program instructions further comprise a response module stored on the one or more memories, wherein the response module is executed by the one or more processors to transmit, in a sixth process and responsive to user input, an action request to reposition a spill response asset, the reposition of the spill response asset being responsive to the trajectory of the fluid spill; and
- wherein the spatial data manager is further executed by the one or more processors to identify, responsive to the deployment location, an asset-tracking device of the plurality of tracking devices that is affixed to the spill response asset, the geographic map further depicting a geographic location of the spill response asset.

37. A machine as defined in claim 33, wherein the computer-executable program instructions further comprise a response module stored on the one or more non-transitory memories, and wherein the response module is executed by the one or more processors to transmit, in a sixth process, an alert of imminent critical contact when any tracking device of the fluid-spill subset is within a predetermined distance of at least one of a plurality of critical locations and to modify a fluid spill response responsive to the alert of imminent critical contact, wherein modifying the fluid spill response includes initiating deployment of spill response assets to at least one of the plurality of critical locations.

38. A machine as defined in claim 33, wherein the computer-executable program instructions further comprise a response module stored on the one or more memories, and wherein the response module is executed by the one or more processors to transmit, in a sixth process, an action request to redeploy a wayward device of the plurality of tracking devices inside a perimeter of the fluid spill, wherein the spatial data manager is further executed by the one or more processors to receive aerial imagery of the fluid spill that is obtained by flyover reconnaissance, the geographic map further depicting the aerial imagery, and wherein the modeling module is further executed by the one or more processors to determine that the wayward device of the plurality of tracking devices is outside the perimeter the fluid spill based on the aerial imagery.

* * * * *